US012648679B2

(12) United States Patent
Park et al.

(10) Patent No.: US 12,648,679 B2
(45) Date of Patent: Jun. 9, 2026

(54) DOCKING STATION, MOBILE ROBOT, AND MOBILE ROBOT MANAGEMENT SYSTEM FOR CONTROLLING DOCKING STATION AND MOBILE ROBOT

(71) Applicant: Samsung Electronics Co., Ltd., Suwon-si (KR)

(72) Inventors: Sanghyuk Park, Suwon-si (KR); Heesuk Yoon, Suwon-si (KR); Kiyong Lee, Suwon-si (KR); Yeonkyu Jeong, Suwon-si (KR); Hyunsoo Jung, Suwon-si (KR); Sanghoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 17/979,352

(22) Filed: Nov. 2, 2022

(65) Prior Publication Data

US 2023/0055824 A1      Feb. 23, 2023

Related U.S. Application Data

(63) Continuation of application No. PCT/KR2021/003868, filed on Mar. 29, 2021.

(30) Foreign Application Priority Data

Jun. 25, 2020     (KR) ........................ 10-2020-0078073

(51) Int. Cl.
*A47L 9/28* (2006.01)
*A47L 11/40* (2006.01)
(Continued)

(52) U.S. Cl.
CPC ......... *A47L 9/2873* (2013.01); *A47L 11/4011* (2013.01); *H04W 4/40* (2018.02); (Continued)

(58) Field of Classification Search
CPC .............. A47L 9/2873; A47L 11/4011; A47L 2201/02; A47L 2201/04; A47L 2201/022; (Continued)

(56) References Cited

U.S. PATENT DOCUMENTS 2,770,825 A  *  11/1956  Pullen ................. A47L 11/4013
                                                                              15/48
5,345,649 A  *   9/1994  Whitlow ................... B08B 5/00
                                                                             15/312.1
(Continued)

FOREIGN PATENT DOCUMENTS

CN          1751650 A        3/2006
CN        207804199 U       9/2018
(Continued)

OTHER PUBLICATIONS

European Office Action dated Feb. 19, 2024, issued in European Patent Application No. 21829366.0.
(Continued)

*Primary Examiner* — Bhavesh V Amin
(74) *Attorney, Agent, or Firm* — Jefferson IP Law, LLP

(57) ABSTRACT

A docking station, a mobile robot, and a mobile robot management method for controlling a docking station and a mobile robot are provided. The mobile robot includes a management method wherein, in order to display information associated with a docking station to an output device of a mobile robot or transmit the information to a user terminal device connected to the mobile robot, the mobile robot transmits, to the user terminal device, information received from the docking station.

19 Claims, 12 Drawing Sheets

10

(51) Int. Cl.
    *H04W 4/40*         (2018.01)
    *H04W 4/80*         (2018.01)

(52) U.S. Cl.
    CPC ........... *H04W 4/80* (2018.02); *A47L 2201/02*
        (2013.01); *A47L 2201/04* (2013.01)

(58) Field of Classification Search
    CPC ............. A47L 2201/024; A47L 9/2894; A47L
        9/2852; H04W 4/40; H04W 4/80; B25J
        9/161; B25J 9/1679; B25J 19/005; B25J
        19/0058
    See application file for complete search history.

(56) References Cited

U.S. PATENT DOCUMENTS

| | | | | |
|---|---|---|---|---|
| 5,787,545 | A * | 8/1998 | Colens | A47L 11/4011 15/340.1 |
| 5,959,423 | A * | 9/1999 | Nakanishi | A47L 11/4008 318/568.25 |
| 5,995,884 | A * | 11/1999 | Allen | G05D 1/0225 701/25 |
| 6,076,226 | A * | 6/2000 | Reed | A47L 5/28 15/340.1 |
| 6,094,775 | A * | 8/2000 | Behmer | A47L 5/36 15/329 |
| 6,263,989 | B1 * | 7/2001 | Won | B62D 55/065 180/9.32 |
| 6,389,329 | B1 * | 5/2002 | Colens | B25J 9/1694 318/587 |
| 6,532,404 | B2 * | 3/2003 | Colens | A47L 11/4011 318/587 |
| 6,552,729 | B1 * | 4/2003 | Di Bernardo | G06T 13/40 345/473 |
| 6,594,844 | B2 * | 7/2003 | Jones | G05D 1/0238 15/49.1 |
| 6,690,134 | B1 * | 2/2004 | Jones | A47L 9/009 318/587 |
| 6,883,201 | B2 * | 4/2005 | Jones | A47L 11/282 15/319 |
| 7,024,278 | B2 * | 4/2006 | Chiappetta | G05D 1/0242 318/567 |
| 7,055,210 | B2 * | 6/2006 | Keppler | A47L 9/2873 15/340.1 |
| 7,155,308 | B2 * | 12/2006 | Jones | G05D 1/0238 701/25 |
| 7,313,461 | B2 * | 12/2007 | Sharma | G05D 1/0282 700/214 |
| 7,389,156 | B2 * | 6/2008 | Ziegler | A47L 7/0009 701/25 |
| 7,429,843 | B2 * | 9/2008 | Jones | G05D 1/0255 901/1 |
| 7,571,511 | B2 * | 8/2009 | Jones | A47L 9/2852 15/319 |
| 7,706,917 | B1 * | 4/2010 | Chiappetta | G05D 1/0225 700/258 |
| 7,720,554 | B2 * | 5/2010 | DiBernardo | G01C 3/06 700/59 |
| 7,779,504 | B2 * | 8/2010 | Lee | A47L 5/225 15/328 |
| 7,801,645 | B2 * | 9/2010 | Taylor | G01S 17/10 318/567 |
| 7,805,220 | B2 * | 9/2010 | Taylor | G05D 1/0274 318/568.17 |
| 7,861,366 | B2 * | 1/2011 | Hahm | A47L 9/009 15/328 |
| 8,065,778 | B2 * | 11/2011 | Kim | A47L 9/1463 15/349 |
| 8,239,992 | B2 * | 8/2012 | Schnittman | B60L 53/14 15/52.1 |
| 8,374,721 | B2 * | 2/2013 | Halloran | B60L 15/2036 342/450 |

| | | | | |
|---|---|---|---|---|
| 8,528,157 | B2 * | 9/2013 | Schnittman | A47L 11/4008 15/340.1 |
| 8,635,739 | B2 * | 1/2014 | Lee | A47L 9/20 15/352 |
| 8,661,605 | B2 * | 3/2014 | Svendsen | A47L 9/0466 15/384 |
| 8,741,013 | B2 * | 6/2014 | Swett | A47L 9/22 55/482 |
| 8,742,926 | B2 * | 6/2014 | Schnittman | A47L 9/19 15/319 |
| 8,756,751 | B2 * | 6/2014 | Jung | A47L 9/30 15/319 |
| 8,761,931 | B2 * | 6/2014 | Halloran | A47L 11/4011 709/227 |
| 8,950,038 | B2 * | 2/2015 | Won | A47L 11/4041 15/340.1 |
| 8,984,708 | B2 * | 3/2015 | Kuhe | A47L 5/24 15/319 |
| 9,008,835 | B2 * | 4/2015 | Dubrovsky | G05D 1/0016 700/264 |
| 9,060,666 | B2 * | 6/2015 | Jang | A47L 11/33 |
| 9,192,272 | B2 * | 11/2015 | Ota | A47L 9/106 |
| 9,233,471 | B2 * | 1/2016 | Schnittman | A47L 11/4013 |
| 9,233,472 | B2 * | 1/2016 | Angle | B25J 13/006 |
| 9,392,920 | B2 * | 7/2016 | Halloran | A47L 11/4041 |
| 9,462,920 | B1 * | 10/2016 | Morin | A47L 9/149 |
| 9,526,391 | B2 * | 12/2016 | Lee | A47L 11/4025 |
| 9,550,294 | B2 * | 1/2017 | Cohen | A47L 9/2873 |
| 9,591,957 | B2 * | 3/2017 | Dyson | A47L 9/1409 |
| 9,599,990 | B2 * | 3/2017 | Halloran | G05D 1/0242 |
| 9,757,004 | B2 * | 9/2017 | Neumann | A47L 9/32 |
| 9,788,698 | B2 * | 10/2017 | Morin | A47L 9/106 |
| 9,826,872 | B2 * | 11/2017 | Schnittman | G05D 1/0225 |
| 9,826,873 | B2 * | 11/2017 | Abe | A47L 11/4041 |
| 9,888,818 | B2 * | 2/2018 | Kuhe | A47L 11/4008 |
| 9,901,236 | B2 * | 2/2018 | Halloran | A47L 11/40 |
| 9,924,846 | B2 * | 3/2018 | Morin | A47L 11/4025 |
| 9,931,007 | B2 * | 4/2018 | Morin | A47L 9/127 |
| 9,931,750 | B2 | 4/2018 | Cohen et al. | |
| 10,022,029 | B2 * | 7/2018 | Machida | A47L 9/2884 |
| 10,213,080 | B2 * | 2/2019 | Saito | A47L 9/2873 |
| 10,244,913 | B2 * | 4/2019 | Schnittman | A47L 11/4011 |
| 10,244,915 | B2 * | 4/2019 | Schnittman | A47L 11/4013 |
| 10,405,718 | B2 | 9/2019 | Morin et al. | |
| 10,463,215 | B2 * | 11/2019 | Morin | A47L 9/2842 |
| 10,464,746 | B2 * | 11/2019 | Conrad | A47L 9/12 |
| 10,595,692 | B2 * | 3/2020 | Morin | A47L 9/1436 |
| 10,595,696 | B2 * | 3/2020 | Harting | A47L 11/4025 |
| 10,624,514 | B2 * | 4/2020 | Park | A47L 9/2852 |
| 10,646,091 | B2 * | 5/2020 | Schnittman | A47L 11/4044 |
| 10,737,395 | B2 * | 8/2020 | Wolff | A47L 9/2873 |
| 10,758,104 | B2 * | 9/2020 | Schnittman | G05D 1/0234 |
| 10,791,891 | B2 * | 10/2020 | Kuhe | A47L 11/4008 |
| 10,856,709 | B2 * | 12/2020 | Kuhe | A47L 9/2805 |
| 10,886,763 | B1 * | 1/2021 | Ha | H02J 7/42 |
| 10,952,578 | B2 * | 3/2021 | Gill | A47L 9/1463 |
| 11,006,806 | B2 * | 5/2021 | Cargill | G05D 7/0676 |
| 11,020,860 | B2 | 6/2021 | Cheuvront et al. | |
| 11,039,725 | B2 * | 6/2021 | Johnson | G05D 1/0225 |
| 11,096,533 | B2 | 8/2021 | Kashihara | |
| 11,134,818 | B2 * | 10/2021 | Kim | A47L 9/106 |
| 11,185,203 | B2 * | 11/2021 | Jeong | A47L 9/2873 |
| 11,191,403 | B2 * | 12/2021 | Gill | A47L 9/0054 |
| 11,202,545 | B2 * | 12/2021 | Amacker | A45B 3/00 |
| 11,246,466 | B2 * | 2/2022 | Schnittman | A47L 9/108 |
| 11,269,355 | B2 * | 3/2022 | Kwak | B25J 9/0084 |
| 11,311,892 | B2 * | 4/2022 | Conrad | B04C 5/28 |
| 11,348,269 | B1 * | 5/2022 | Ebrahimi Afrouzi | G01S 17/48 |
| 11,357,372 | B2 * | 6/2022 | Buening | A47L 9/2852 |
| 11,357,373 | B2 * | 6/2022 | Buening | A47L 9/2805 |
| 11,445,880 | B2 * | 9/2022 | Morin | A47L 11/4011 |
| 11,445,881 | B2 * | 9/2022 | Conrad | A47L 9/22 |
| 11,503,969 | B2 * | 11/2022 | Cho | A47L 5/24 |
| 11,529,034 | B2 * | 12/2022 | Conrad | A47L 9/12 |
| 11,556,125 | B2 * | 1/2023 | Jones | G05D 1/0274 |
| 11,556,131 | B2 * | 1/2023 | Kim | B25J 11/008 |
| 11,627,853 | B2 * | 4/2023 | Park | A47L 9/2852 15/319 |

(56) References Cited

U.S. PATENT DOCUMENTS

| | | | |
|---|---|---|---|
| 11,641,988 B2* | 5/2023 | Kuhe | A47L 5/24 15/301 |
| 11,657,531 B1* | 5/2023 | Ebrahimi Afrouzi | G06V 10/44 382/284 |
| 11,672,399 B2* | 6/2023 | Schnittman | A47L 9/19 15/49.1 |
| 11,717,124 B2* | 8/2023 | Conrad | A47L 9/149 15/301 |
| 11,717,129 B2* | 8/2023 | Finison | A47L 11/4005 15/49.1 |
| 11,730,329 B2* | 8/2023 | Brown | A47L 9/2873 15/319 |
| 11,737,625 B2* | 8/2023 | Conrad | A47L 9/149 15/347 |
| 11,744,428 B2* | 9/2023 | Marutani | A47L 11/4061 15/319 |
| 11,812,917 B2* | 11/2023 | Liang | A47L 11/4011 |
| 11,896,190 B1* | 2/2024 | Xu | A47L 9/106 |
| 11,906,979 B2* | 2/2024 | Kwak | A47L 9/2857 |
| 11,950,736 B2 | 4/2024 | Johnson et al. | |
| 11,969,139 B2* | 4/2024 | Morin | A47L 9/009 |
| 11,998,150 B2* | 6/2024 | Innes | A47L 9/12 |
| 12,004,704 B2* | 6/2024 | Morin | A47L 9/281 |
| 12,029,379 B2* | 7/2024 | Conrad | A47L 9/2873 |
| 12,082,768 B2* | 9/2024 | Eirinberg | A47L 9/2894 |
| 12,102,283 B2* | 10/2024 | Jo | G10L 15/28 |
| 12,171,392 B2* | 12/2024 | Cho | A47L 5/24 |
| 12,239,285 B2* | 3/2025 | Lee | A47L 9/2889 |
| 2002/0016649 A1* | 2/2002 | Jones | G05D 1/0238 700/245 |
| 2002/0120364 A1* | 8/2002 | Colens | G05D 1/0242 700/262 |
| 2002/0124343 A1* | 9/2002 | Reed | A47L 5/28 15/319 |
| 2002/0189871 A1* | 12/2002 | Won | B25J 5/005 180/9.32 |
| 2003/0025472 A1* | 2/2003 | Jones | G05D 1/0227 318/568.17 |
| 2004/0020000 A1* | 2/2004 | Jones | G05D 1/0238 180/169 |
| 2004/0049877 A1* | 3/2004 | Jones | A47L 9/009 15/319 |
| 2004/0187249 A1* | 9/2004 | Jones | A47L 7/02 15/319 |
| 2004/0187457 A1* | 9/2004 | Colens | A01D 34/008 56/1 |
| 2004/0255425 A1* | 12/2004 | Arai | A47L 9/2873 15/300.1 |
| 2005/0015920 A1* | 1/2005 | Kim | A47L 9/1409 15/352 |
| 2005/0067994 A1* | 3/2005 | Jones | G05D 1/0234 318/587 |
| 2005/0113978 A1* | 5/2005 | Sharma | G05D 1/0282 700/259 |
| 2005/0132680 A1* | 6/2005 | Wegelin | A47L 9/1409 55/429 |
| 2005/0150519 A1* | 7/2005 | Keppler | A47L 9/2805 15/340.3 |
| 2005/0183229 A1* | 8/2005 | Uehigashi | A47L 9/2805 15/340.1 |
| 2005/0204717 A1* | 9/2005 | Colens | G05D 1/648 56/344 |
| 2007/0157415 A1* | 7/2007 | Lee | A47L 9/2873 15/319 |
| 2007/0157420 A1* | 7/2007 | Lee | A47L 5/28 15/328 |
| 2007/0226949 A1* | 10/2007 | Hahm | A47L 9/009 15/340.1 |
| 2007/0245511 A1* | 10/2007 | Hahm | A47L 9/106 134/21 |
| 2007/0250212 A1* | 10/2007 | Halloran | A47L 9/009 901/1 |
| 2008/0047092 A1* | 2/2008 | Schnittman | A47L 11/4069 15/3 |
| 2008/0052846 A1* | 3/2008 | Kapoor | A47L 9/19 15/52.1 |
| 2008/0140255 A1* | 6/2008 | Ziegler | B60B 33/0049 15/4 |
| 2008/0235897 A1* | 10/2008 | Kim | A47L 11/4013 901/1 |
| 2008/0282494 A1* | 11/2008 | Won | A47L 11/4011 15/412 |
| 2009/0044370 A1* | 2/2009 | Won | A47L 11/4013 15/319 |
| 2009/0049640 A1* | 2/2009 | Lee | A47L 9/20 901/1 |
| 2009/0082879 A1* | 3/2009 | Dooley | G06N 3/004 700/3 |
| 2010/0049365 A1* | 2/2010 | Jones | G05D 1/0219 901/1 |
| 2010/0125968 A1* | 5/2010 | Ho | A47L 5/00 15/319 |
| 2010/0257691 A1* | 10/2010 | Jones | A47L 9/0494 15/319 |
| 2010/0324736 A1* | 12/2010 | Yoo | G05D 1/0276 398/201 |
| 2011/0077802 A1* | 3/2011 | Halloran | G05D 1/028 701/2 |
| 2012/0011676 A1* | 1/2012 | Jung | A47L 9/0477 15/301 |
| 2012/0060320 A1* | 3/2012 | Lee | A47L 9/20 15/347 |
| 2012/0090126 A1* | 4/2012 | Kim | A47L 9/009 15/319 |
| 2012/0169497 A1* | 7/2012 | Schnittman | A47L 9/106 340/540 |
| 2012/0199006 A1* | 8/2012 | Swett | A47L 9/22 96/417 |
| 2012/0291809 A1* | 11/2012 | Kuhe | A47L 11/33 134/18 |
| 2013/0031744 A1* | 2/2013 | Ota | A47L 9/106 15/348 |
| 2013/0253701 A1* | 9/2013 | Halloran | A47L 9/0466 700/245 |
| 2013/0298350 A1* | 11/2013 | Schnittman | A47L 9/106 15/49.1 |
| 2013/0335900 A1* | 12/2013 | Jang | A47L 5/24 361/679.01 |
| 2014/0207280 A1* | 7/2014 | Duffley | G05D 1/0016 700/257 |
| 2014/0207282 A1* | 7/2014 | Angle | B25J 13/006 901/1 |
| 2014/0229008 A1* | 8/2014 | Schnittman | G05D 1/0225 700/259 |
| 2014/0249671 A1* | 9/2014 | Halloran | G05D 1/028 901/50 |
| 2015/0057800 A1* | 2/2015 | Cohen | A47L 9/2873 701/2 |
| 2015/0223651 A1* | 8/2015 | Kuhe | A47L 9/2805 15/301 |
| 2015/0375395 A1* | 12/2015 | Kwon | H02J 7/50 901/30 |
| 2016/0113469 A1* | 4/2016 | Schnittman | A47L 9/2894 250/221 |
| 2016/0166126 A1* | 6/2016 | Morin | A47L 9/0477 15/319 |
| 2016/0183752 A1* | 6/2016 | Morin | A47L 9/19 15/340.1 |
| 2016/0249780 A1* | 9/2016 | Yoon | G05D 1/622 701/23 |
| 2016/0291595 A1* | 10/2016 | Halloran | G05D 1/0242 |
| 2016/0374528 A1* | 12/2016 | Morin | A47L 11/4011 15/319 |
| 2017/0135543 A1* | 5/2017 | Halloran | B25J 5/007 |
| 2017/0150861 A1* | 6/2017 | Tanaka | A47L 9/28 |
| 2017/0217019 A1* | 8/2017 | Cohen | A47L 9/2873 |
| 2017/0231452 A1* | 8/2017 | Saito | A47L 9/28 15/319 |

(56) References Cited

U.S. PATENT DOCUMENTS

| | | | |
|---|---|---|---|
| 2017/0273532 A1* | 9/2017 | Machida | A47L 9/28 |
| 2018/0008111 A1* | 1/2018 | Morin | A47L 9/2857 |
| 2018/0125312 A1* | 5/2018 | Kuhe | A47L 11/4025 |
| 2018/0177369 A1* | 6/2018 | Morin | A47L 9/2815 |
| 2018/0199776 A1* | 7/2018 | Sato | A47L 9/1641 |
| 2018/0199784 A1* | 7/2018 | Schnittman | G01N 21/47 |
| 2018/0206686 A1* | 7/2018 | Shigeto | A47L 9/0477 |
| 2018/0236663 A1* | 8/2018 | Cohen | A47L 9/2873 |
| 2018/0249872 A1* | 9/2018 | Park | G06T 7/74 |
| 2018/0284786 A1* | 10/2018 | Moshkina-Martinson | A47L 9/2852 |
| 2019/0167060 A1* | 6/2019 | Schnittman | A47L 9/281 |
| 2019/0212730 A1* | 7/2019 | Jones | G05D 1/0234 |
| 2019/0223679 A1* | 7/2019 | Schnittman | G05D 1/0234 |
| 2019/0346849 A1* | 11/2019 | Moshkina-Martinson | G05D 1/024 |
| 2019/0387946 A1* | 12/2019 | Schnittman | A47L 9/106 |
| 2020/0000301 A1 | 1/2020 | Morin et al. | |
| 2020/0029496 A1* | 1/2020 | Nam | G01G 19/022 |
| 2020/0029765 A1* | 1/2020 | Morin | A47L 9/106 |
| 2020/0081453 A1* | 3/2020 | Kwak | A47L 9/28 |
| 2020/0121148 A1 | 4/2020 | Hoffman et al. | |
| 2020/0154963 A1* | 5/2020 | Kuhe | A47L 11/33 |
| 2020/0187736 A1* | 6/2020 | Jeong | A47L 9/2873 |
| 2020/0242136 A1* | 7/2020 | Chambers | G06F 16/29 |
| 2020/0249688 A1* | 8/2020 | Caussy | G05D 1/0225 |
| 2020/0281428 A1* | 9/2020 | Buening | A47L 9/2831 |
| 2020/0281430 A1* | 9/2020 | Morin | A47L 9/009 |
| 2021/0089040 A1* | 3/2021 | Ebrahimi Afrouzi | G05D 1/0248 |
| 2021/0147150 A1* | 5/2021 | Huang | G05D 1/0225 |
| 2021/0186280 A1* | 6/2021 | Kuhe | A47L 11/4025 |
| 2021/0282610 A1* | 9/2021 | Cho | A47L 5/24 |
| 2021/0330165 A1 | 10/2021 | Lee | |
| 2021/0374967 A1* | 12/2021 | Ramanathan | G06T 7/194 |
| 2022/0066456 A1* | 3/2022 | Ebrahimi Afrouzi | G06F 3/04883 |
| 2022/0147057 A1* | 5/2022 | Kwak | A47L 9/2805 |
| 2022/0160201 A1* | 5/2022 | Cho | A47L 5/225 |
| 2022/0167821 A1* | 6/2022 | Schnittman | A47L 11/4008 |
| 2022/0240743 A1* | 8/2022 | Jo | A47L 9/2894 |
| 2022/0276658 A1* | 9/2022 | Wang | G05D 1/028 |
| 2022/0287524 A1* | 9/2022 | Cho | A47L 5/24 |
| 2023/0012532 A1* | 1/2023 | Kim | A47L 9/106 |
| 2023/0030384 A1* | 2/2023 | Kwak | A47L 9/2852 |
| 2023/0055824 A1* | 2/2023 | Park | A47L 11/4011 |
| 2023/0111023 A1* | 4/2023 | Cho | A47L 5/24 134/21 |
| 2023/0144509 A1* | 5/2023 | Yun | G05D 1/0225 15/319 |
| 2023/0146588 A1* | 5/2023 | Kim | A47L 9/106 15/347 |
| 2023/0199637 A1* | 6/2023 | Dou | H04W 48/20 370/331 |
| 2023/0255418 A1* | 8/2023 | Choi | A47L 9/1409 15/319 |
| 2023/0329500 A1* | 10/2023 | Jeon | A47L 9/0063 |
| 2023/0346184 A1* | 11/2023 | Messenger | A47L 9/281 |
| 2023/0380647 A1* | 11/2023 | Lee | A47L 7/00 |
| 2024/0152156 A1* | 5/2024 | Eun | G05D 1/246 |
| 2024/0176362 A1* | 5/2024 | Jung | H04W 4/80 |
| 2024/0219921 A1* | 7/2024 | Jung | G01S 17/931 |
| 2024/0253502 A1* | 8/2024 | Poluboiarinov | B60L 53/30 |
| 2024/0407615 A1* | 12/2024 | Morin | A47L 9/127 |

FOREIGN PATENT DOCUMENTS

| | | | |
|---|---|---|---|
| CN | 110876587 A | 3/2020 | |
| CN | 110974090 A | 4/2020 | |
| CN | 111227717 A | 6/2020 | |
| JP | 2017-536938 A | 12/2017 | |
| KR | 10-2007-0021762 A | 2/2007 | |
| KR | 10-2009-0111170 A | 10/2009 | |
| KR | 10-2017-0105045 A | 9/2017 | |
| KR | 10-2019-0003159 A | 1/2019 | |
| KR | 10-2020-0022764 A | 3/2020 | |
| KR | 10-2089984 B1 | 3/2020 | |

OTHER PUBLICATIONS

Extended European Search Report dated Aug. 7, 2023, issued in European Patent Application No. 21829366.0.

Korean Office Action dated Sep. 23, 2025, issued in Korean Application No. 10-2020-0078073.

Chinese Office Action date Nov. 27, 2025, issued in Chinese Application No. 202180045134.3.

* cited by examiner

FIG. 10

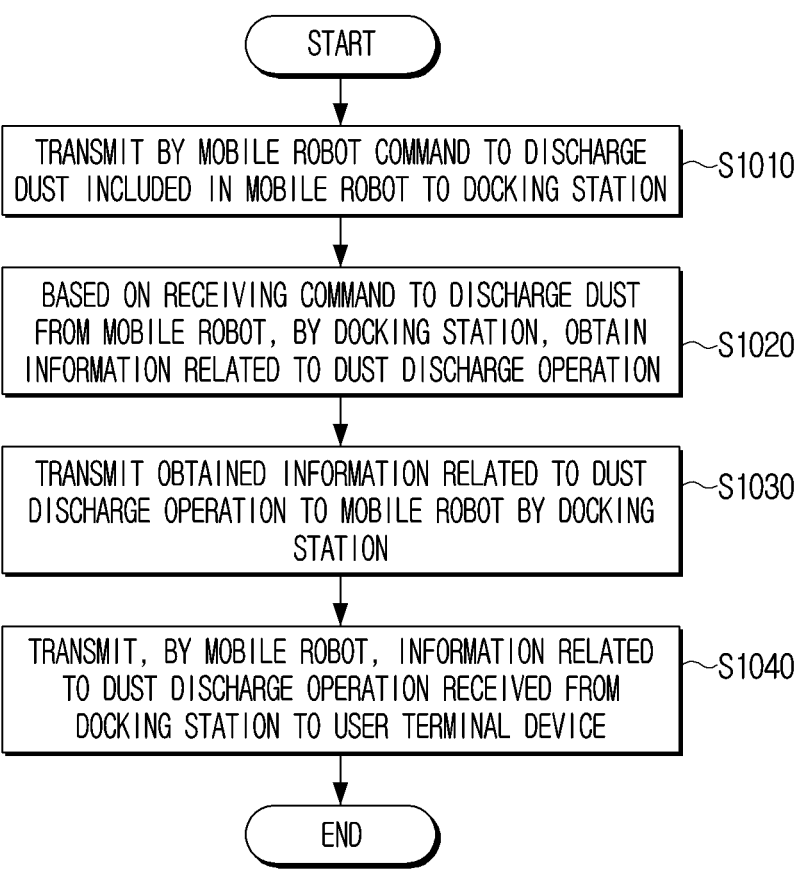

START

TRANSMIT BY MOBILE ROBOT COMMAND TO DISCHARGE DUST INCLUDED IN MOBILE ROBOT TO DOCKING STATION — S1010

BASED ON RECEIVING COMMAND TO DISCHARGE DUST FROM MOBILE ROBOT, BY DOCKING STATION, OBTAIN INFORMATION RELATED TO DUST DISCHARGE OPERATION — S1020

TRANSMIT OBTAINED INFORMATION RELATED TO DUST DISCHARGE OPERATION TO MOBILE ROBOT BY DOCKING STATION — S1030

TRANSMIT, BY MOBILE ROBOT, INFORMATION RELATED TO DUST DISCHARGE OPERATION RECEIVED FROM DOCKING STATION TO USER TERMINAL DEVICE — S1040

END

1

DOCKING STATION, MOBILE ROBOT, AND MOBILE ROBOT MANAGEMENT SYSTEM FOR CONTROLLING DOCKING STATION AND MOBILE ROBOT

CROSS-REFERENCE TO RELATED APPLICATION(S)

This application is a continuation application, claiming priority under § 365(c), of an International application No. PCT/KR2021/003868, filed on Mar. 29, 2021, which is based on and claims the benefit of a Korean patent application number 10-2020-0078073, filed on Jun. 25, 2020, in the Korean Intellectual Property Office, the disclosure of which is incorporated by reference herein in its entirety.

BACKGROUND

1. Field

This disclosure relates to a docking station, a mobile robot, and a mobile robot management method for controlling a docking station and a mobile robot. More particularly, the disclosure relates to a mobile robot management method for transmitting information associated with a docking station to a terminal device connected to the mobile robot.

2. Description of Related Art

In the case of a docking station of a related-art mobile robot, only a fractional function, such as charging of a mobile robot has been performed, and thus, a docking station does not require a separate component, such as a display or a speaker. However, as demand for mobile robots and research and development are increasing, functions of the docking station that performs various functions for the mobile robot have also increased when the mobile robot is docked.

However, as various functions of the docking station have been developed, a user has to determine the state of the docking station, but in the case of an interface method of the related-art docking station, there is a limitation in that a user may not smoothly determine the state of the docking station. Accordingly, in order to improve the interface between the docking station and the user, various wireless communication modules or output modules are included in the docking station, but there is a limitation in that the device of the docking station becomes complicated and the price increases.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a mobile robot management method in which the mobile robot transmits the information received from the docking station to the user terminal device in order to display the information associated with the docking station to the output device of the mobile robot or transmit the same to the user terminal device connected with the mobile robot.

Additional aspects will be set forth in part in the description which follows and, in part, will be apparent from the description, or may be learned by practice of the presented embodiments.

In accordance with an aspect of the disclosure, a docking station of a mobile robot is provided. The docking station includes a near-field communicator to communicate with the mobile robot, a memory, and a processor configured to, based on receiving a command to discharge dust from the mobile robot through the near-field communicator, obtain information related to dust discharge operation, and in order to transmit the obtained information related to the dust discharge operation to a user terminal device connected to the mobile robot, control the near-field communicator to transmit the information related to the dust discharge operation to the mobile robot.

The processor may identify whether a numeral value corresponding to the obtained information related to dust discharge operation exceeds a threshold range, and based on identification that the numeral value exceeds the threshold range, control the near-field communicator to transmit the information related to the dust discharge operation to the mobile robot.

The information related to the dust discharge operation may include information about a component to discharge dust included in the mobile robot, and the component to discharge the dust included in the mobile robot may include at least one of a dust bag, a filter, or a motor for sucking dust.

The information about the dust bag may include a surplus space of the dust bag, whether the dust bag is mounted, and a type of the dust bag, wherein the information about the filter may a number of uses of the filter, a use time, whether a filter is mounted, and a type of a filter, and the information about the motor may include an operation efficiency use time, a failure state, and a type of the motor.

The processor may, while performing an operation to discharge dust included in the mobile robot, obtain the information about the dust bag, filter, and the motor, respectively, and control the near-field communicator to transmit the obtained information about the dust bag, filter, and motor, respectively, to the mobile robot.

The processor may, based on receiving a wake-up signal from the mobile robot while the docking station is operating in a stand-by mode, switch an operation mode of the docking station from a standby mode to a normal mode, control the near-field communicator so that the docking station transmits a docking guide signal to the mobile robot while the docking station is operating in the normal mode.

The processor may, based on receiving a command to discharge dust included in the mobile robot from the mobile robot, determine whether to perform the dust discharge operation, and based on determination that the dust discharge operation is not performed, control the near-field communicator to transmit the information related to the dust discharge operation to the mobile robot.

The processor may, based on the mobile robot being docked on the docking station, control the near-field communicator to transmit the information about the type of the docking station to the mobile robot, and receive at least one command corresponding to the information about the type of the docking station from the mobile robot through the near-field communicator.

The processor may, based on receiving a command to charge power of the mobile robot from the mobile robot through the near-field communicator, obtain information about at least one of a power storage device, a power transmission device, or a power generation device included in the docking station, and control the near-field communicator to transmit the obtained information about at least one of the power storage device, power transmission device, or power generation device to the mobile robot.

The near-field communicator may include at least one of an infrared communication module or a radio frequency module.

In accordance with another aspect of the disclosure, a mobile robot is provided. The mobile robot includes a communicator comprising a circuitry, a memory, and a processor configured to, based on docking on the docking station, control a near-field communicator, among the communicators, to transmit a command to discharge dust included in the mobile robot to the docking station, receive information related to dust discharge operation from the docking station through the near-field communicator, and control the communicator to transmit the received information about the dust discharge operation to a user terminal device.

The processor may control the near-field communicator to periodically transmit a wake-up signal that enables to switch an operation mode of the docking station from a standby mode to a normal mode.

The processor may, based on the mobile robot being docked on the docking station, control the near-field communicator to transmit a signal requesting information about a type of the docking station to the mobile robot.

The processor may, based on receiving information about the type of the docking station from the mobile robot, control the near-field communicator to transmit at least one command corresponding to the information about the type of docking station to the docking station.

The processor may, based on identification that the docking station is a model of a type of charging power of the mobile robot based on the information about the type of the docking station, control the near-field communicator to transmit a command to charge power to the docking station.

The processor may, based on identification that the docking station is a model of a type to discharge dust included in the mobile robot based on the information about the type of the docking station, control the near-field communicator to transmit the command to discharge dust to the docking station.

The mobile robot may further include a speaker, and the processor may control the speaker to output a message corresponding to the received information about the dust discharge operation in a voice format.

The processor may, in order to transmit the obtained information related to the dust discharge operation to a user terminal device connected to the mobile robot, control the near-field communicator to transmit the information related to the dust discharge operation to the mobile robot.

As an embodiment to achieve the objective of the disclosure, a mobile robot management method including a docking station and a mobile robot includes transmitting a command to discharge dust included in the mobile robot to the docking station by the mobile robot, based on receiving a command to discharge dust from the mobile robot by the docking station, obtaining information related to the dust discharge operation, transmitting the obtained information related to the dust discharge operation to the mobile robot by the docking station, and transmitting the information related to the dust discharge operation received from the docking station by the mobile robot to the user terminal device.

As described above, according to various embodiments of the disclosure, a user may be provided with a docking station of a mobile robot capable of reducing a price by minimizing and optimizing components while providing the same interface and convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a flowchart illustrating a mobile robot management method capable of controlling a docking station and a mobile robot according to an embodiment of the disclosure.

Throughout the drawings, like reference numerals will be understood to refer to like parts, components, and structures.

DETAILED DESCRIPTION

Figure 1:
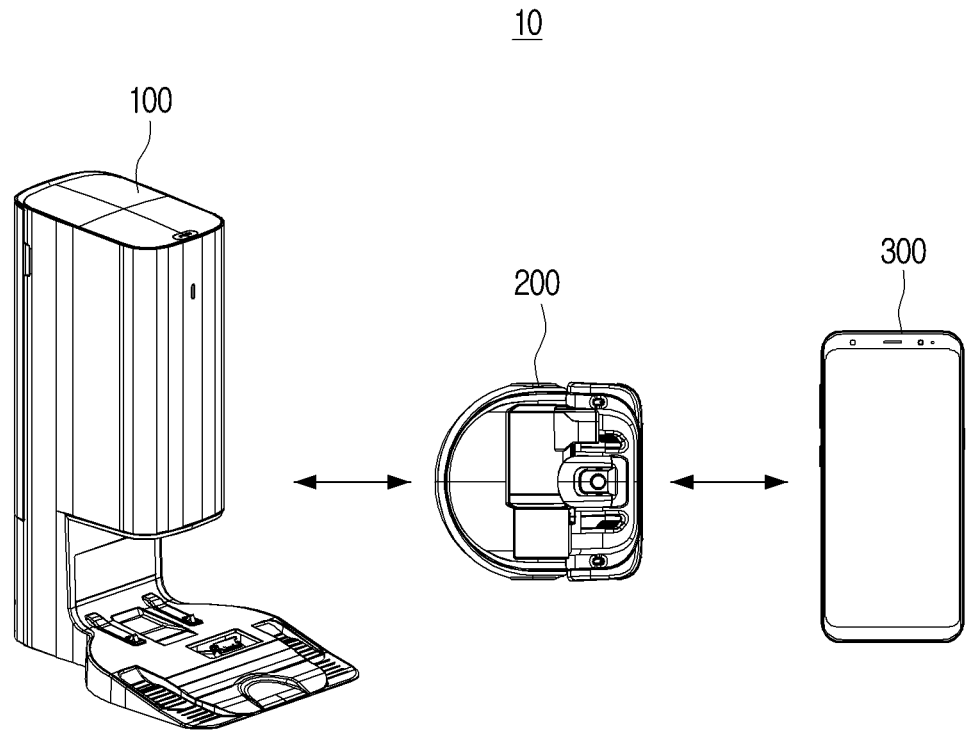
FIG. 1 is a diagram illustrating an operation of a docking station, a mobile robot, and a user terminal device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment of the disclosure, and are not intended to limit the scope of the claims. The expression of a singular includes a plurality of representations, unless the context clearly indicates otherwise.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of" The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor unit (CPU) or application processor (AP)) that can perform the corresponding actions by executing one or more software programs stored in the memory device.

The terms, such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown).

The disclosure relates to a mobile robot management system and method in which a docking station and a mobile robot communicate bi-directionally and share various information and signals, and the mobile robot transmits information received from a docking station to a user terminal device. Various information (e.g., state information of the docking station or information related to a specific operation) to be transmitted to the user terminal device through the mobile robot by the docking station may not be information that the user of the user terminal device should identify in real time or frequently. The state information of the docking station or the information related to the specific operation may be sufficient information even the user of the user terminal device may identify when the mobile robot is docked on the docking station. Accordingly, the docking station may transmit various information to the mobile robot without having to include a separate long-range communication module, and the mobile robot may transmit information obtained from the docking station to the user terminal device, so that the user of the user terminal device may identify information transmitted by the docking station.

Hereinafter, with reference to the attached drawings, embodiments will be described below so that those skilled in the art to which the disclosure belongs to can easily make and use the embodiments.

FIG. 1 is a diagram illustrating an operation of a docking station, a mobile robot, and a user terminal device included in the mobile robot management system according to an embodiment of the disclosure.

Referring to FIG. 1, a mobile robot 200 is implemented as a cleaning robot for performing a task, such as cleaning, air purification, and security guard while traveling in a space in a building, but this is merely an example, and the mobile robot 200 may be implemented as various mobile robots, such as a housework robot for performing housework while traveling a space in a home, a military robot for performing a task by being placed in a dangerous area that a person cannot access, and the like, but is not limited to the above-described example.

A user terminal device 300 is implemented as a smartphone, but this is merely an example, and the user terminal device 300 may be implemented as various terminal devices, such as a tablet PC, a desktop PC, a laptop PC, a netbook computer, a server, a medical device, or a wearable device, but is not limited thereto.

A docking station 100 may selectively operate in one of a normal mode or a standby mode. The normal mode may refer to an operation mode in which the docking station 100 may transmit a docking guide signal to the mobile robot 200 or perform various functions with respect to the docked mobile robot 200. When the docking station 100 operates in the normal mode, various components and modules included in the docking station 100 may be activated. The standby mode refers to an operation mode in which the docking station 100 maintains minimum power without performing a specific function, and may be expressed as a sleep mode. Accordingly, when the docking station 100 operates in the standby mode, various components and modules included in the docking station 100 may be deactivated. However, even when the docking station 100 operates in the standby mode, a near field communicator 110 may be activated to receive the wake-up signal from the mobile robot 200. An embodiment related thereto will be described later.

When receiving a command to perform at least one operation from the mobile robot 200 while operating in the normal mode, the docking station 100 may perform at least one operation corresponding to the received command. Specifically, the docking station 100 may receive a command for performing at least one operation from the mobile robot 200 through the near field communicator. The near field communicator may include at least one of an infrared communication module or a radio frequency (RF) module. In another embodiment of the disclosure, the docking station 100 may receive a command to perform at least one operation from the mobile robot 200 through a docking terminal connected when the mobile robot is docked or a separate wired terminal.

If the mobile robot 200 is docked on the docking station 100, the docking station 100 may transmit information about the type of the docking station 100 to the mobile robot 200. The mobile robot 200 may transmit a command to perform at least one operation corresponding to the type of the docking station 100 to the docking station 100 based on the information on the type of the docking station 100. For example, the operation corresponding to the command received from the mobile robot 200 may include an operation corresponding to at least one of a type, a model, and a serial number of the docking station.

For example, if it is identified that the docking station 100 is a device (or model) capable of performing only a function of charging a power storage device, such as a battery of the mobile robot 200 through information about a type of the docking station 100, the mobile robot 200 may transmit a command to perform a battery charge function to the docking station 100.

As another example, when the docking station 100 is identified as a type of device capable of charging the battery of the mobile robot 200 through the information on the type of the docking station 100 and sucking and discharging the dust collected in the mobile robot 200, the mobile robot 200 may transmit a command to charge power to the docking station 100 and a command to perform a function of suctioning the dust collected in the mobile robot 200 to the mobile robot 200. The type of the docking station 100 is not limited to the above-described example, and may be variously classified according to a function that may be performed by the docking station.

When a command to perform a specific operation is received from the mobile robot 200, the docking station 100 may obtain information related to a specific operation simultaneously when receiving a command or within a threshold time. As another example, the docking station 100 may obtain information related to a specific operation while performing a specific operation. As another example, the docking station 100 may obtain information related to a specific operation after terminating the performance of a specific operation.

According to an embodiment of the disclosure, it is assumed that the docking station 100 is a model of a type capable of discharging (or suctioning) dust collected in the mobile robot 200. When a command to perform an operation of discharging (or suctioning) dust included (or collected) in the mobile robot 200 is received from the mobile robot 200, the docking station 100 may obtain information related to the dust discharge operation. The information related to dust discharge operation may include information about components (for example, a dust bag, a filter, a dust bin including a dust bag, or the like) used to discharge dust included in the mobile robot 200 by the docking station 100. In this case, the dust bag means an envelope in which dust is contained when the dust collected in the mobile robot 200 is suctioned to the docking station 100, and the filter may include a dust container filter, an exhaust filter, a motor filter, and the like. When the docking station 100 receives a command for discharging dust included in the mobile robot 200 from the mobile robot 200, the docking station 100 may obtain information related to the dust discharge operation (for example, information about each motor capable of sucking dust bag, filter, and dust).

The information about the dust bag may include at least one of information on the available space of the dust bag, information on whether the dust bag is mounted, information about opening and closing of the dust container on which the dust bag is mounted, information about at least one of the type of the filter, and the like, and the information about the filter may include information about the times of use of the filter, whether the filter is mounted, and type of the filter, and the information about a motor may include at least one of the operation efficiency of the motor, the failure of the motor, the type of the motor, and the information on the usage time of the motor. However, this is merely an example, and the information on each component may be variously added/modified/deleted in a user's setting or manufacturing step.

According to another embodiment of the disclosure, when the mobile robot 200 is docked on the docking station 100, the docking station 100 may immediately obtain information related to the dust discharge operation. For example, even if the docking station 100 does not receive a command from the mobile robot 200, the docking station 100 may obtain information related to the dust discharge operation at the same time or within a threshold time. If it is identified that the mobile robot 200 is located in a region where the communication connection may be performed even though the mobile robot 200 does not receive a command to discharge dust from the mobile robot 200, the docking station 100 may obtain information related to the dust discharge operation from the mobile robot 200.

According to another embodiment of the disclosure, it is assumed that the docking station 100 is a model of a type capable of performing a function of charging the mobile robot 200. When a command to perform a function of charging power from the mobile robot 200 is received, the docking station 100 may obtain information about components related to the operation of charging the power of the mobile robot 200 (e.g., a power storage device of the docking station 100, a power generation device, and a power transmission device). The power generation device may refer to a component that generates power to operate the docking station 100 and stores the power in the power storage device, and may include, but is not limited to, a generator or the like. The power transmitter may transmit power to the mobile robot 200 to charge the mobile robot 200, and may charge the mobile robot 200 in a wireless or wired manner. The power storage device may refer to a component that stores power so that the docking station 100 operates, and may include, for example, at least one of a battery, a fuel cell, and a secondary battery.

The information on the power storage device of the docking station 100 may include information on the charging state of the power storage device and information on the charging efficiency of the power storage device. The information on the power transmission device may include information on the charging efficiency of the mobile robot 200 of the power transmission device.

Upon receiving a command to perform at least one operation from the mobile robot 200, the docking station 100 may determine whether at least one operation may be performed. If it is determined that at least one operation may not be performed, the docking station 100 may transmit information related to at least one operation or state information of the docking station 100 to the mobile robot 200. The mobile robot 200 may transmit information related to the received at least one operation or state information of the docking station 100 to the user terminal device 300. This embodiment will be described below with reference to FIG. 6.

Meanwhile, the docking station 100 may transmit information (for example, information related to a dust discharge operation, information related to a power charging operation of the mobile robot 200, or the like) related to a specific operation obtained in various manners to the mobile robot 200. In an embodiment of the disclosure, the docking station 100 may transmit information related to an operation performed by the mobile robot 200 or an operation performed by the docking station 100 obtained at the same time or within a threshold time to the mobile robot 200. As another example, the docking station 100 may periodically transmit information related to an operation after the mobile robot 200 is docked on the mobile robot 200 according to a predetermined period. As another example, when information related to an operation to be performed is obtained, the docking station 100 may transmit the obtained information to the mobile robot 200 in real time. As another example, when a user command to transmit various information from the user terminal device 300 is received from the mobile robot 200, the docking station 100 may transmit various information to the mobile robot 200.

As another example, the docking station 100 may identify whether a numerical value corresponding to information related to various operations (e.g., information related to a dust discharge operation) exceeds a threshold range. When it is identified that the numerical value corresponding to the various types of information exceeds the threshold range, the docking station 100 may transmit various information to the mobile robot 200. This embodiment will be described below with reference to FIG. 5.

The mobile robot 200 may transmit information related to various operations received from the docking station 100 and state information of the docking station 100 to the user terminal device 300 or may provide the state information to the user. For example, the mobile robot 200 may output information related to operation and state information of the docking station 100 as a message in a voice form or display a UI including information on a component. Accordingly, the user may identify the information related to the operation or the state of the docking station through the voice message or the UI output by the mobile robot 200.

When a specific operation (e.g., a power charging operation of the mobile robot 200 or an operation of discharging dust collected in the mobile robot 200) performed by the docking station 100 to the mobile robot 200 is completed, the mobile robot 200 may transmit information related to various operations and state information of the docking station 100 to the user terminal device 300. In another embodiment of the disclosure, when it is identified that the numerical value corresponding to the information associated with various operations and the state information received from the docking station 100 exceeds a threshold range, the mobile robot 200 may transmit information about various operations and status information to the user terminal device 300. In another embodiment of the disclosure, when the power of the mobile robot 200 is less than the threshold value, the mobile robot 200 may transmit information related to various operations and status information received from the docking station 100 to the user terminal device 300. In this case, the mobile robot 200 may transmit a signal indicating that the charged power state is less than a threshold value to the user terminal device 300.

The mobile robot 200 may transmit information related to various operations to the user terminal device 300 or may transmit information related to various operations to a pre-registered device (e.g., another terminal device of the user of the user terminal device 300). The user terminal device 300 may display the UI based on the information on the component received from the mobile robot 200. Accordingly, the user may identify a state of a consumable of the docking station through the user terminal device 300.

Figure 2:
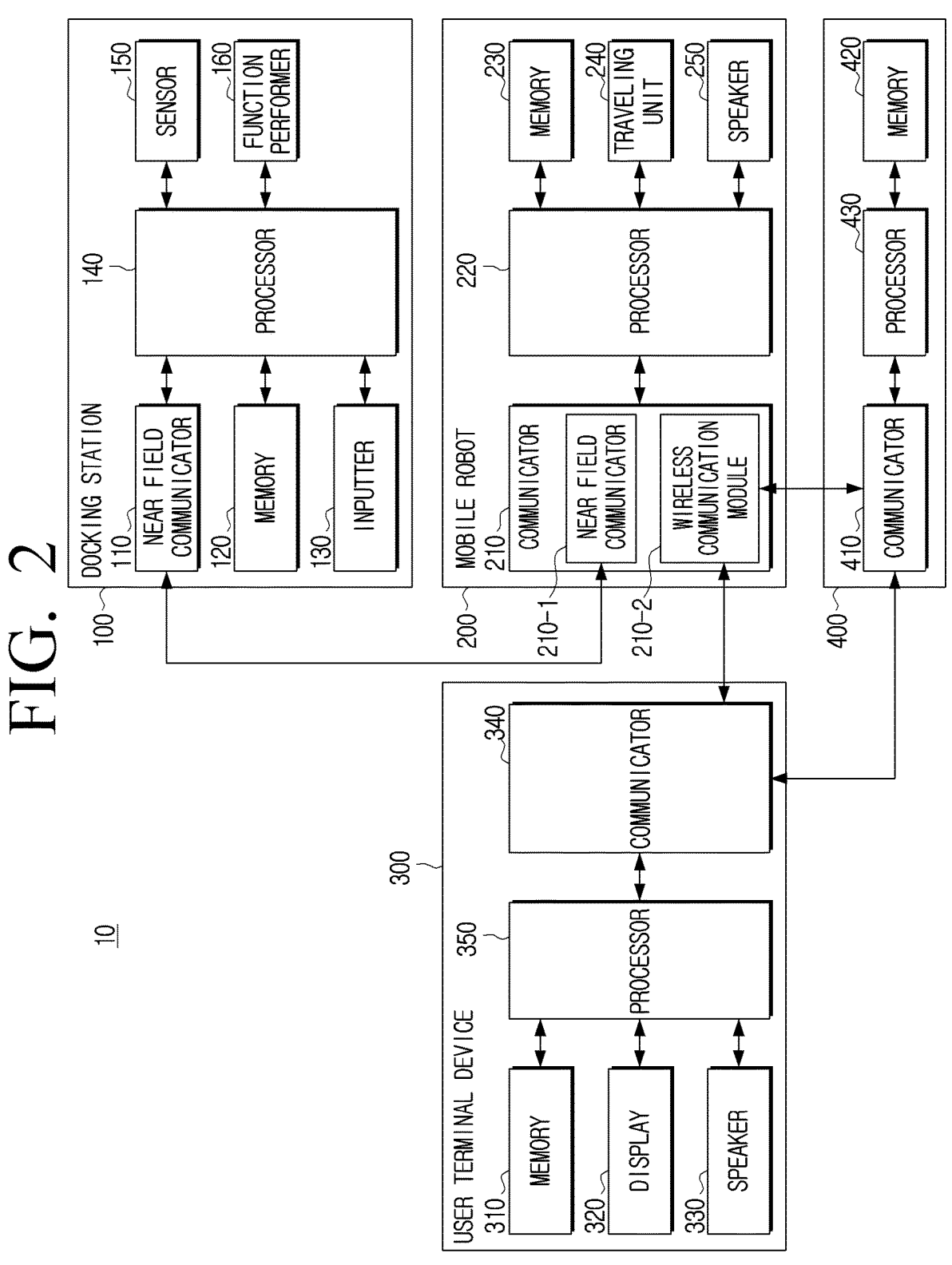
FIG. 2 is a diagram illustrating a configuration of a docking station, a mobile robot, a user terminal device, and a server according to an embodiment of the disclosure.

FIG. 2 is a diagram illustrating a configuration of a docking station, a mobile robot, a user terminal device, and a server included in a mobile robot management system according to an embodiment of the disclosure.

Referring to FIG. 2, the docking station 100 may include a near field communicator 110, a memory 120, an inputter 130, a processor 140, a sensor 150, and a function performer 160. However, the configuration illustrated in FIG. 2 is an example for implementing embodiments of the disclosure, and appropriate hardware and software configurations that are obvious to a person skilled in the art may be additionally included in the docking station 100.

The near field communicator 110 may include a circuit, and may communicate with a near field communicator 210-1 included in the mobile robot 200 or a near field communicator included in another device. The near field communicator 110 may transmit and receive various signals or information between the mobile robot 200 or the near field communicator included in various devices. For example, the near field communicator 110 may receive a command to perform at least one operation transmitted from the near field communicator 210-1 of the mobile robot 200. In this case, the command to perform at least one operation may be a command directly generated by the mobile robot 200, and may be a command instructing the user terminal device 300 to transmit the mobile robot 200 to the docking station 100.

The near field communicator 110 may transmit information related to an operation performed by the docking station 100 (for example, information related to an operation of discharging dust included in the mobile robot 200) to the mobile robot 200. The near field communicator 110 may receive a wake-up signal transmitted by the near field communicator 210-1 of the mobile robot 200 and transmit a docking guide signal to the mobile robot 200. The wake-up signal is a signal for switching the operation mode of the docking station 100 from the power saving mode to the normal mode, and a detailed description thereof will be described later.

The docking guide signal periodically transmitted to the mobile robot 200 by the near field communicator 110 may include a preset idle time period. The mobile robot 200 may transmit a wake-up signal within an idle time period included in the docking guide signal transmitted by the near field communicator 110. Accordingly, the mobile robot 200 may minimize or reduce signal interference by transmitting a wake-up signal within an idle time period included in the docking guide signal.

The near field communicator 110 may include at least one of an infrared communication module or radio frequency (RF) module. The infrared communication module may include an infrared transmitting/receiving circuit, or a photo transistor, or the like.

The near field communicator 110 may be activated in a state in which the power of the docking station 100 is turned on. For example, even when the docking station 100 is operating in the standby mode, the near field communicator 110 may receive the wake-up signal transmitted from the near field communicator 210-1 of the mobile robot 200.

The memory 120 may store at least one instruction or data related to at least one another element. The instruction is one action statement for the processor 140 as a programming language, and is a minimum unit of programs that the processor 140 may execute directly.

According to an embodiment of the disclosure, the memory 120 may be implemented as a non-volatile memory, a volatile memory, a flash-memory, a hard disk drive (HDD), a solid-state drive (SSD), or the like. The memory 120 may be accessed by the processor 140, and read/write/modify/update, or the like, of data by the processor 140 may be performed. The term memory in the disclosure may include the memory 120, a read-only memory (ROM) (not shown) in the processor 140, a random access memory (RAM) (not shown), or a memory card (not shown) (e.g., a micro secure digital (SD) card, a memory stick) mounted on the stacked docking station 100.

The memory 120 may store information related to various operations performed by the docking station 100 and state information of the docking station 100. Specifically, the memory 120 may store information related to an operation obtained while the processor 140 performs an operation corresponding to a command received from the mobile robot 200. The memory 120 may store state information of the current docking station.

The inputter 130 may receive various user inputs and transmit the user inputs to the processor 140. In particular, the inputter 130 may include at least one of a touch sensor, a button, and a key. The inputter 130 may be implemented as a button for switching an operation mode of the docking station 100. For example, when a command to switch the operation mode from the normal mode to the standby mode is input through the inputter 130, the processor 140 may switch the operation mode of the docking station 100 from the normal mode to the standby mode.

The processor 140 may be electrically connected to the memory 120 to control overall operations and functions of the docking station 100. The processor 140 may control the near field communicator 110 to transmit the docking guide signal to the mobile robot 200. Upon receiving the docking guide signal, the mobile robot 200 may move to the docking station 100 by moving in a direction in which the docking station 100 is located.

When the wake-up signal is received from the mobile robot 200 through the near field communicator 110 while the docking station 100 is operating in the standby mode, the processor 140 may switch the operation mode of the docking station to the normal mode. The processor 140 may transmit the docking guide signal to the mobile robot 200 while operating in the normal mode.

If the mobile robot 200 is docked on the docking station 100, the processor 140 may receive a command to perform at least one operation through the near field communicator 110 from the mobile robot 200. When a command to perform at least one operation from the mobile robot 200 is received through the near field communicator 110, the processor 140 may obtain information related to at least one operation. At this time, at least one operation may be an operation corresponding to the type of the docking station 200. Specifically, when the mobile robot 200 is docked on the docking station 100, the processor 140 may transmit information about the type of the docking station to the mobile robot 200 through the near field communicator 110. The information about the type of the docking station may include, for example, information about whether the docking station is a model of a type capable of charging the mobile robot 200 or a model of a type capable of sucking dust collected in the robot 200. The mobile robot 200 may transmit a command corresponding to each type to the docking station 100.

The processor 140 may receive a command to perform at least one operation from the mobile robot 200 or obtain information related to at least one operation within a threshold time. As another example, the processor 140 may obtain information related to at least one operation while performing at least one operation. As another example, after the processor 140 finishes at least one operation, the processor 140 may obtain information related to at least one operation. As another example, if it is detected that the mobile robot 200 is located in an area where the mobile robot 200 is capable of communicating even without receiving a command from the mobile robot 200, the processor 140 may obtain information related to an operation that the docking station 100 may perform.

In an embodiment of the disclosure, when the docking station 100 is a model of a type capable of suctioning and discharging dust collected in the mobile robot 200, the processor 140 may receive a command for removing dust included (or collected) in the mobile robot 200 from the mobile robot 200 through the near field communicator 110. When receiving a command to discharge the dust included in the mobile national robot 200, the processor 140 may obtain information related to an operation related to the dust discharge operation. The information related to the dust discharge operation may include information about components (e.g., a dust bag, a filter, and a motor for suctioning dust) used to discharge dust. The processor 140 may obtain information about a motor for suctioning the dust bag, the filter, and the dust.

The processor 140 may obtain information about the spare space of the dust bag through the sensor 150 capable of detecting the spare space of the dust bag. As another example, the processor 140 may obtain information on whether the dust bag is mounted on the dust container through the various sensors 150 and information on the type of the dust bag (e.g., information on the unique model number, size, specification, and the like of the dust bag).

The processor 140 may obtain information on the usage count of the filter and the usage time based on the time when the filter is replaced. As another example, the processor 140 may obtain information on whether the filter is mounted in the docking station 100 through the various sensors 150 and information on the type of the filter (e.g., the unique model number of the filter, the function performed by the filter, the standard information of the filter, and the like).

The processor 140 may obtain information on the operation efficiency of the motor through a sensor capable of detecting the operation efficiency of the motor or foreign matter stuck on the motor. The processor 140 may obtain information on the use time of the motor based on the motor replacement time. In another embodiment of the disclosure, the processor 140 may obtain information on whether the motor has failed. For example, the processor 140 may identify whether the motor operates normally based on at least one of a rotation speed, whether the motor operates, and an operation efficiency of the motor. The standard of the normal operation of the motor may be determined in the manufacturing step and may be modified by the user.

According to another embodiment of the disclosure, when the docking station 100 is a model of a type capable of charging the mobile robot 200, the processor 140 may receive a command for charging the mobile robot 200 from the mobile robot 200 through the near field communicator 110. When receiving a command to charge the mobile robot 200, the processor 140 may obtain information related to the operation of charging the mobile robot 200. The information related to the operation of charging the mobile robot 200 may include information on the power storage device, the power generation device, and the power transmission device.

The processor 140 may obtain information on the charging state of the power storage device and information on the charging efficiency of the power storage device. The processor 140 may obtain information on the charging efficiency of the mobile robot 200 through the power transmitted from the power transmitter to the mobile robot 200. In another embodiment of the disclosure, while charging the mobile robot 200 through the power transmitting device or in the standby mode, the processor 140 may generate power using the power generating device to supply power from the power storage device. Accordingly, the processor 140 may obtain information on the power production efficiency of the power storage device while charging the mobile robot 200.

Upon receiving a command to perform at least one operation from the mobile robot 200 through the near field communicator 110, the processor 140 may determine whether at least one operation may be performed. In one embodiment of the disclosure, when receiving a command to charge the power of the mobile robot 200 from the mobile robot 200, the processor 140 may determine whether the mobile robot 200 may be charged based on whether the docking station 200 is in a state capable of transmitting power to the mobile robot 200. For example, the processor 140 may determine whether the power of the mobile robot 200 may be transmitted based on whether the power storage device is charged enough to transmit power to the mobile robot 200 when the docking station is in a wireless state.

In another embodiment of the disclosure, when a command to discharge (or suck) dust contained (or collected) in the mobile robot 200 is received from the mobile robot 200 through the near field communicator 110, the processor 140 may determine whether a dust discharge operation may be performed. The processor 140 may determine whether to perform the dust discharge operation based on whether there is surplus space in the dust bag of the docking station, whether the dust bag exists in the dust bin at the docking station, and whether the usage time of the filter or motor exceeds a threshold time based on the time of replacement.

If it is determined that at least one operation may not be performed, the processor 140 may control the near field communicator 110 to transmit status information of the docking station related to at least one operation to the mobile robot 200 in order to transmit state information of the docking station 100 related to the at least one operation to the user terminal device 300 connected to the mobile robot 100. For example, if it is determined that the dust discharging operation may not be performed, the processor 140 may control the near field communicator 110 to transmit state information of the docking station related to the dust discharging operation to the mobile robot 200. In addition, the mobile robot 200 may transmit state information of the docking station related to the dust discharge operation received from the docking station 100 to the user terminal device 300.

In order to transmit the obtained information related to the at least one operation to the user terminal device 300 connected to the mobile robot 200, the processor 140 may control the near field communicator 110 to transmit the obtained information related to the at least one operation (e.g., information related to dust discharging operation, or the like) to the mobile robot 200. In an embodiment of the disclosure, the processor 140 may control the near field communicator 110 to transmit the obtained information to the mobile robot 200 in real time or periodically when information related to at least one operation is obtained.

In another embodiment of the disclosure, the processor 140 may transmit the information related to the at least one operation to the mobile robot 200 based on whether a value corresponding to the information related to the at least one operation exceeds a threshold range. The processor 140 may identify whether a value corresponding to the at least one operation-related information exceeds a threshold range by using the obtained information related to the at least one operation. When it is identified that the value corresponding to the at least one operation-related information exceeds the threshold range, the processor 140 may control the near field communicator 110 to transmit the at least one operation-related information to the mobile robot 200.

However, the processor 140 may include, for example, and without limitation, one or more from among a central processing unit (CPU), a micro controller unit (MCU), a micro processing unit (MPU), a controller, an application processor (AP), a communication processor (CP), an advanced reduced instruction set computer machine (ARM) processor, or the like, or may be defined by the corresponding term. In addition, the processor 140 may be implemented as a System on Chip (SoC) or large-scale integration (LSI) embedded with a processing algorithm, and may be implemented in the form of a field programmable gate array (FPGA). The processor 140 may perform various functions by executing computer executable instructions stored in the memory 120.

The sensor 150 may detect various state information of the docking station 100. The sensor 150 may include a pressure sensor capable of detecting the surplus space of the dust bag included in the docking station 100. The sensor 150 may be implemented as a sensor for detecting the operational efficiency of a motor for sucking the dust collected by the mobile robot 100 and a sensor for detecting whether a dust bag is provided in the dust bin. In addition, the sensor 150 may be implemented as a sensor that calculates and detects power efficiency based on the power transmitted by the power transmitter to the mobile robot 200.

The function performer 160 is a component capable of performing various functions of the docking station 100. For example, the function performer 160 is a component capable of charging the mobile robot 200 and may include a power transmission device, or the like. As another example, the function performer 160 may include a motor, a filter, or the like, capable of removing dust collected in the mobile robot 200.

Referring to FIG. 2, the mobile robot 200 may include a communicator 210, a processor 220, a memory 230, a traveling unit 240, and a speaker 250. However, this is only an embodiment of the disclosure, and the mobile robot 200 may additionally include appropriate hardware and software configurations that are obvious to those skilled in the art.

The communicator 210 may communicate with the docking station 100, the mobile robot 200, the user terminal device 300, the server 400, and various devices. The communicator 210 may include a near field communicator 210-1 and a wireless communication module 210-2, and may also include various wired communication modules (not shown). The near field communicator 210-1 may include at least one of an infrared communication module and an RF module. The near field communicator 210-1 may transmit/receive various signals or information between the near field communicators 110 included in the docking station 100. For example, the near field communicator 210-1 may transmit at least one command corresponding to the information on the type of the docking station 100 to the docking station 100. As another example, the near field communicator 210-1 may receive information about the type of the docking station 100, state information of the docking station 100, or information related to specific operation from the docking station 100. As another example, the near field communicator 210-1 may transmit a wake-up signal to the docking station 100 and may receive a docking guidance signal from the docking station 100.

The communication module 210-2 may include a cellular communication module using any one of long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to another embodiment of the disclosure, the wireless communication may include, for example, any one or any combination of wireless fidelity (Wi-Fi), Bluetooth, Bluetooth low energy (BLE), Zigbee, and near field communication (NFC).

The wireless communication module 210-2 may communicate with the user terminal device 300 and the server 400 on the mobile robot management system 10, and may transmit/receive various signals or information. That wireless communication module 210-2 performs communication may include communicating via a third device (e.g., a repeater, a hub, an access point, the server 400 or a gateway, or the like).

The processor 220 may be electrically connected to the memory to control the overall operation and function of the mobile robot 200. In particular, when docked on the docking station 100, the processor 220 may control the near field communicator 210-1 to transmit a command to discharge the dust included (or collected) in the mobile robot 200 to the docking station 100. The information related to a dust discharge operation may be received from the docking station 100 through the near field communicator 210-1.

According to another embodiment of the disclosure, when docked on the docking station 100, the processor 220 may control the near field communicator 210-1 to transmit a signal for requesting information on the type of the docking station 100 to the mobile robot 200. When receiving information on the type of the docking station 100 through the near field communicator 210-1, the processor 220 may control the near field communicator 210-1 to transmit at least one command corresponding to the information about the type of the docking station 100 to the docking station 100. For example, when it is identified that the docking station 100 is a type of model capable of charging the mobile robot based on the information on the type of the docking station 100, the processor 220 may control the near field communicator 210-1 to transmit a command to charge power to the docking station 100. As another example, when it is identified that the docking station 100 is a type of model capable of discharging dust included in the mobile robot 200 based on the information on the type of the docking station 100, the processor 220 may control the near field communicator 210-1 to transmit a command to discharge dust to the docking station 100.

The processor 220 may control the wireless communication module 210-2 to transmit information related to various operations received from the docking station 100 (for example, information related to a dust discharge operation or information related to a power charging operation) to the user terminal device 300. The processor 220 may directly transmit information related to various operations to the user terminal device 300, or may control the wireless communication module 210-2 to transmit the information to the user terminal device 300 through the server 400. In this case, the server 400 may include a server of the manufacturer of the mobile robot 200 or the docking station 100, a server of the application store, or a relay server.

The processor 220 may control the speaker 250 to output a message corresponding to information related to various operations received from the docking station 100 in a voice form. As another example, the processor 220 may control a display (not shown) to display a user interface (UI) including a message corresponding to information related to various operations received from the docking station 100.

The processor 220 may control the near field communicator 210-1 to periodically emit a wake-up signal for switching the operation mode of the docking station 100 from the standby mode to the normal mode. The processor 220 may receive the docking guide signal from the docking station 100 operating in the normal mode, through the near field communicator 210-1. Upon receiving the docking guide signal, the processor 220 may control the traveling unit 240 to move in the direction of the docking station 100 for docking to the docking station 100.

The memory 230 may store instructions or data related to at least one other component of the mobile robot 200. The memory 230 may be accessed by the processor 220, and read/write/modify/update, or the like, of data by the processor 220 may be performed. The term memory in the disclosure may include the memory 230, a read-only memory (ROM) (not shown) in the processor 220, a random access memory (RAM) (not shown), or a memory card (not shown) (e.g., a micro secure digital (SD) card, a memory stick) mounted on the stacked mobile robot 200.

The memory 230 may store information about the type of the docking station 100 received from the docking station 100 and status information. As another example, the memory 230 may store information related to various operations received from the docking station 100. The memory 230 may store instructions or data for displaying various UIs on a display.

The traveling unit 240 is a device that helps the mobile robot 200 to move, and may be configured as a wheel, or may be configured as a device capable of moving in a non-standard moving form, such as an N-foot walking. The traveling unit 240 may be configured to perform rotations in front, rear, left, and right, and rotation. For example, the traveling unit 240 may be variously configured according to the type and characteristics of the mobile robot device 200.

The speaker 250 is configured to output various notification sounds or voice messages as well as various audio data on which various processing operations, such as decoding, amplification, and noise filtering are performed by the audio processor. In particular, the speaker 250 may output a message corresponding to information related to various operations in a voice form under the control of the processor 220.

Referring to FIG. 2, the user terminal device 300 may include a memory 310, a display 320, a speaker 330, a communicator 340, and a processor 350. This is merely exemplary, and the user terminal device 300 may additionally include hardware and software configurations obvious to those skilled in the art.

The memory 310 may store instructions or data related to at least one other component of the user terminal device 300. The memory 310 may be accessed by the processor 350, and read/write/modify/update, or the like, of data by the processor 350 may be performed. The term memory in the disclosure may include the memory 310, a read-only memory (ROM) (not shown) in the processor 350, a random access memory (RAM) (not shown), or a memory card (not shown) (e.g., a micro secure digital (SD) card, a memory stick) mounted on the stacked user terminal device 300. The memory 310 may store information related to various operations performed by the docking station 100 received from the mobile robot 200 (or received through the server 400). The memory 310 may store programs, data, or the like, to configure various screens to be displayed on a display region of the display 320.

The display 320 may display various information under the control of the processor 350. The display 320 may display a UI capable of determining state information or information related to operation of the docking station or a UI capable of controlling the docking station 100. As another example, the display 320 may display an application screen capable of controlling the docking station 100 or the mobile robot 200. The related embodiment will be described with reference to FIGS. 9A, 9B, and 9C. The display 320 may be implemented as a touch screen together with a touch panel, or may be implemented in the form of a flexible display.

The speaker 330 is a configuration to output not only various audio data processed as decoding, amplification, and noise filtering but also various notification sounds or speech message. The speaker 330 may output a message corresponding to information related to various operations performed by the docking station 100 in a voice format.

The communicator 340 may communicate with the mobile robot 200, the server 400, and various external devices. Communication of the communicator 340 with the mobile robot 200 or an external device, or the like, may include communication through a third device (e.g., a relay, a hub, an access point, the server 400, a gateway, or the like).

The communicator 340 may include various communication modules to communicate with an external device. For example, the communicator 340 may include a wireless communication module, such as the wireless communication module 210-2 of the mobile robot 200, and may include a cellular communication module. The communicator 340 may also include various wired communication modules. The communicator 340 may receive information related to various operations performed by the docking station 100 from the mobile robot 200, and may receive the corresponding information through the server 400. The communicator 340 may transmit a command for performing a specific operation to the docking station 100 to the mobile robot 200. In this case, the processor 220 of the mobile robot may control the near field communicator 210-1 to transmit the received command to the docking station 100. The communicator 340 may transmit a command for performing a specific operation to the mobile robot 200.

The processor 350 may be electrically connected to the memory 310 to control various operations and functions of the user terminal device 300. In particular, the processor 350 may receive information related to various operations performed by the docking station from the mobile robot 200 through the communicator 340. The processor 350 may update information related to an operation that the pre-stored docking station 100 may perform as information related to the received operation. The processor 350 may receive information related to operation directly from the mobile robot 200, but may receive the information through the server 400.

The processor 350 may control the display 320 to display an application screen including a UI indicating received information related to various operations performed by the docking station. As another example, the processor 350 may control the display 320 to display an application screen including a control UI capable of controlling the mobile robot 200 or the docking station 100. As another example, the processor 350 may control the speaker 330 to output a message corresponding to information related to various operations performed by the received docking station in a voice form.

Referring to FIG. 2, the server 400 may include a communicator 410, a memory 420, and a processor 430. The communicator 410 may include a circuit and may include various wireless communication modules. The memory 420 may store instructions or data related to at least one other component included in the server 400. The memory 420 may store identification information for identifying each of the mobile robot 200 or the docking station 100 that may be controlled by the user terminal device 300. The memory 420 may store data related to an application capable of controlling the mobile robot 200 or the docking station 100.

The processor 430 may be electrically connected to the memory 420 to control the operation of the server 400. The processor 430 may control the communicator 410 to transmit various information received from the mobile robot 200 to the user terminal device 300.

The processor 430 may control the communicator 410 to transmit various information received from the user terminal device 300 to the mobile robot 200. The processor 430 may store various information received from the mobile robot 200 and the user terminal device 300 in the memory 420.

Figure 3:
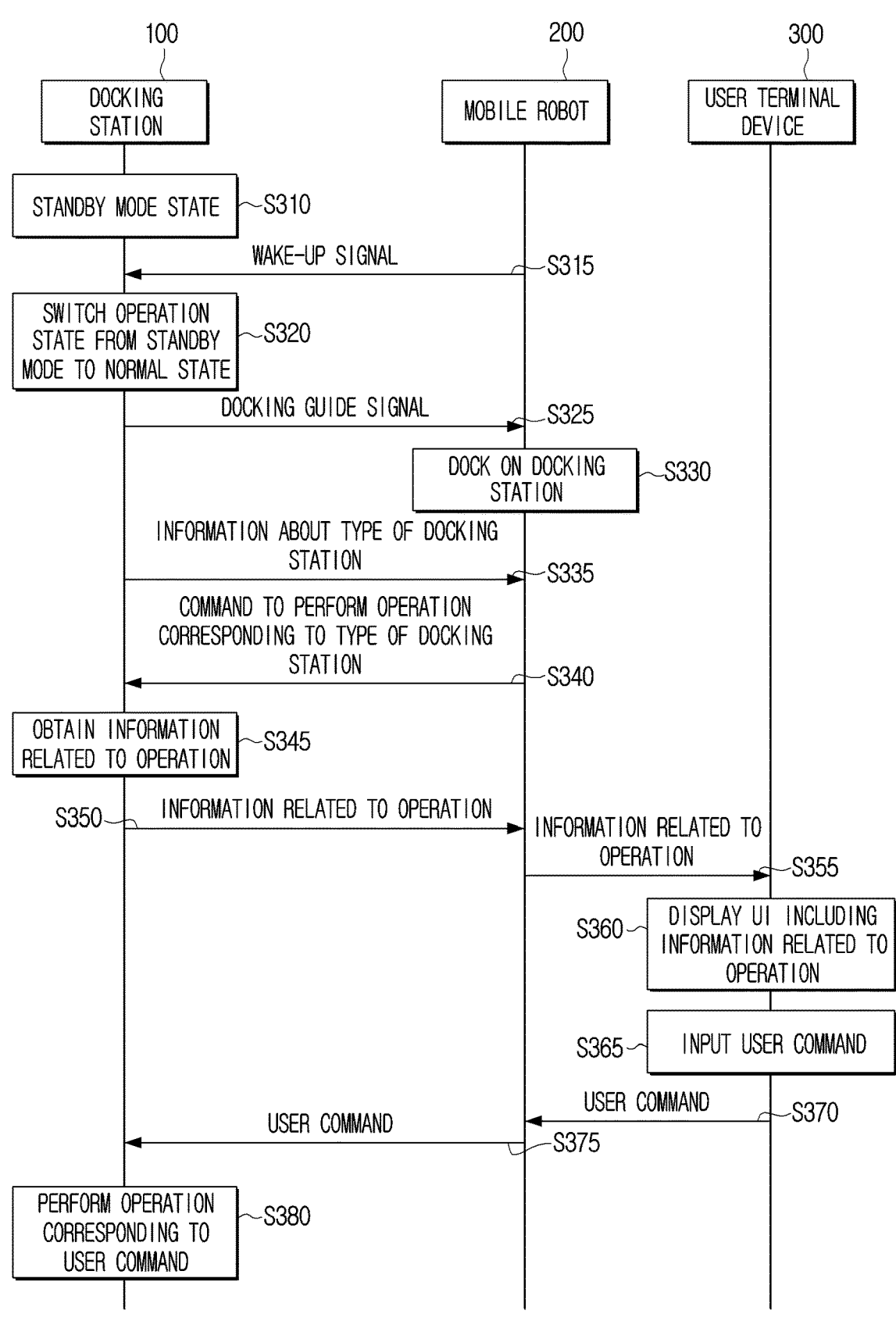
FIGS. 3, 4, 5, and 6 are sequence diagrams to illustrate an operation of a docking station, a mobile robot, and a user terminal device according to various embodiments of the disclosure.

FIG. 3 is a sequence diagram illustrating an operation of a docking station, a mobile robot, and a user terminal device according to an embodiment of the disclosure.

Referring to FIG. 3, first, the docking station 100 may operate in a standby mode in operation S310. Specifically, the docking station 100 may operate in the standby mode by a user command. For example, a user command may be input to an inputter included in the docking station 100 to operate in a standby mode. As another example, when a command to operate in the standby mode from the user terminal device 300 through the mobile robot 200 is received through the near field communicator 110, the docking station 100 may operate in the standby mode.

The docking station 100 may turn on power with minimum power while operating in the standby mode. Accordingly, while the docking station 100 is operating in the standby mode, the docking station 100 may not transmit the docking guide signal to the mobile robot 200.

In operation S315, the mobile robot 200 may transmit a wake-up signal to the docking station 100. Specifically, the mobile robot 200 may transmit a wake-up signal capable of switching the operation mode of the docking station 100 from the standby mode to the normal mode to the mobile robot 200 through a near field communication module, such as an infrared transmission module. In an embodiment of the disclosure, the mobile robot 200 may periodically transmit the wake-up signal to the docking station 100 through the near field communication module. In another embodiment of the disclosure, the mobile robot 200 may transmit a wake-up signal to the docking station 100 when a value corresponding to the battery or various components required to perform or the cleaning of the mobile robot 200 exceeds a threshold range. For example, the mobile robot 200 may transmit a wake-up signal to the docking station 100 when the remaining capacity of the dust bag collecting the dust or various contaminants of the mobile robot 200 is less than a predetermined value. As another example, the mobile robot 200 may transmit a wake-up signal to the docking station 100 when an error occurs in a component included in the mobile robot 200. When the wake-up signal is received through the near field communication module, the docking station 100 may switch the operation state from the standby mode to the normal mode in operation S320. The docking station 100 may transmit the docking guide signal through the near field communicator 110 while operating in the normal mode in operation S325. Upon receiving the docking guide signal, the mobile robot 200 may move to the direction of the docking station 100 and dock on the docking station 100, and when the docking guide signal is less than a predetermined value, the mobile robot 200 may transmit the wake-up signal to the docking station 100 in operation S330.

Inference may occur between the docking guide signal transmitted by the docking station 100 while operating in the normal mode and the wake-up signal transmitted by the mobile robot 200. Accordingly, an idle time interval may be included on the docking guide signal transmitted by the docking station 100. The mobile robot 200 may transmit the wake-up signal in the idle time period on the docking guide signal. The interference between signals transmitted by each of the docking station 100 and the mobile robot 200 may be minimized or reduced.

When the mobile robot 200 is docked, the docking station 100 may transmit information about the type of the docking station to the mobile robot 200 through the near field communicator in operation S335. The information about the type of the docking station may correspond to at least one of information about a function that the docking station may perform, docking station model information, and a unique number of the docking station. In another embodiment of the disclosure, the mobile robot 200 may transmit a signal requesting information on the type of the docking station 100 to the docking station 100 after docking on the docking station 100. The docking station 100 may transmit information about the type of the docking station 100 to the mobile robot 200 in response to the request signal.

The mobile robot 200 may transmit a command for performing an operation corresponding to at least one of the types and the unique number of the docking station 100 to the docking station 100 based on the received information on the type of the docking station 100 in operation S340. The type of the docking station may be variously classified according to a function that the docking station 100 may perform. Accordingly, the operation corresponding to the type of the docking station may mean a command to perform an operation that the docking station may perform. For example, when the docking station 100 is a type of model capable of performing a function of discharging (or suctioning) dust included (or collected) in the mobile robot 200, the mobile robot 200 may transmit a command to perform an operation of discharging dust included in the mobile robot 200 to the docking station 100.

The docking station 100 may obtain information related to an operation corresponding to the command received from the mobile robot 200 in operation S345. For example, the docking station 100 may receive a command for discharging dust included in the mobile robot 200. In this case, the docking station 100 may obtain information related to a dust discharge operation (for example, information about a dust bag, a filter, and a motor). As another example, the docking station 100 may receive a command to charge the power of the mobile robot 200 In this case, the docking station 100 may obtain information related to the operation of charging the power of the mobile robot 200 (for example, information on the charging state of the power storage device, information on the charging efficiency of the power storage device, and information on the charging efficiency of the power transmission device, or the like). Since the related embodiment has been described above, a redundant description thereof will be omitted.

When receiving a command to perform a specific operation from the mobile robot, the docking station 100 may obtain information related to a specific operation at the same time or within a threshold time. As another example, the docking station 100 may obtain information related to a specific operation while performing a specific operation. As another example, the docking station 100 may obtain information related to a specific operation after terminating the performance of a specific operation.

An embodiment in which the docking station 100 receives a command to perform at least one operation from the mobile robot 200 and obtains information related to an operation corresponding to the received command has been described with reference to S320 to S340, but this is merely an example. In another embodiment of the disclosure, even if the docking station 100 does not receive a command from the mobile robot 200, the docking station 100 may obtain information related to the dust discharge operation at the same time or within a threshold time from docking of the mobile robot 200 to docking station 100.

The docking station 100 may transmit information related to the obtained operation to the mobile robot 200 in operation S350. For example, the docking station 100 may transmit information related to an operation to the mobile robot 200 using a near field communicator, such as an infrared transmission module or an RF transmission module.

The mobile robot 200 may transmit information related to the operation received from the docking station 100 to the user terminal device 300 using various communication modules in operation S355. Since the mobile robot 200 may include various wireless communication modules, even if the docking station 100 includes only a near field communicator having a relatively low price and is simple, the user terminal device 300 may identify information related to the operation through the mobile robot 200. The mobile robot 200 may directly transmit information related to an operation to the user terminal device 300, but this is merely an example, and a server of a manufacturer, a server of an application store, or a relay server may be used. Specifically, the mobile robot 200 may transmit information related to an operation to at least one of a manufacturer's server (or a cloud), a server of an application store, or a relay server. At least one of the manufacturer's server (or cloud), the server of the application store, or the relay server may transmit information related to the operation received from the mobile robot 200 to the user terminal device 300.

According to another embodiment of the disclosure, the mobile robot 200 may output information about components received from the docking station 100 as a message in a voice form. This embodiment will be described below with reference to FIGS. 9A, 9B, and 9C.

The user terminal device 300 may display a UI including information related to an operation based on received information related to the operation in operation S360, and the user terminal device 300 may receive a command from the user in operation S365. The user terminal device 300 may transmit the input command to the mobile robot 200 in operation S370. In this example, the command input from the user may be a command for performing a specific operation to the mobile robot 200, but may be a command for performing a specific operation to the docking station 100. When the command input from the user is a command for performing a specific operation to the docking station 100, the command may indicate that user terminal device 300 gives a command to the mobile robot 200 to transmit the user command to the docking station 100.

When the command input from the user is a command to make the docking station 100 perform a specific operation, the mobile robot 200 may transmit a user command to the docking station 100 in operation S375. Accordingly, the docking station 100 may perform an operation corresponding to the user command in operation S380. However, FIG. 3 is only an example of the disclosure, and the user terminal device 300 may receive a command from a user at any point in time. The user terminal device 300 may transmit the received command to the mobile robot 200, and the mobile robot 200 may perform an operation corresponding to the received command.

Figure 4:
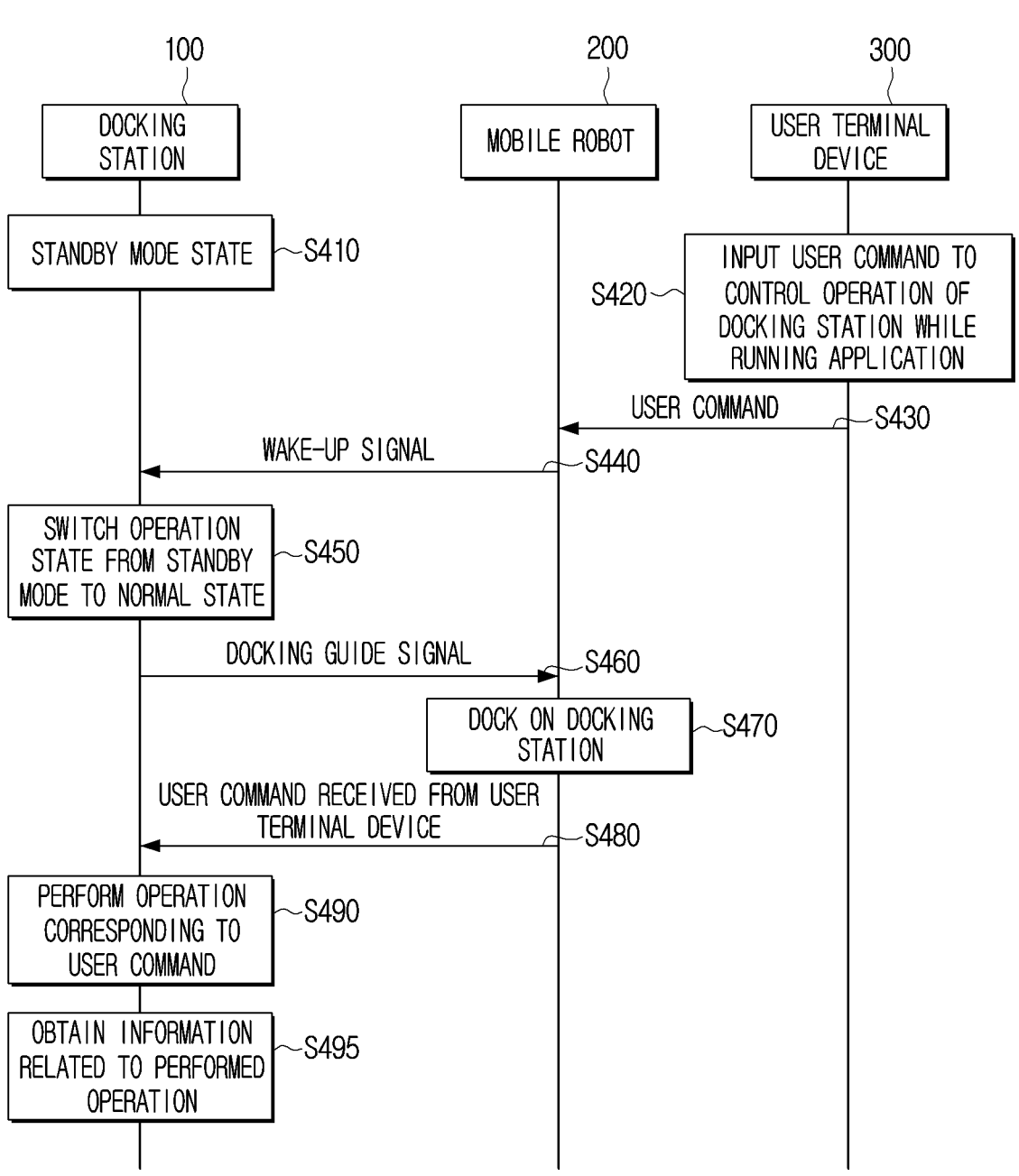

FIG. 4 is a sequence diagram illustrating an operation of a docking station, a mobile robot, and a user terminal device according to an embodiment of the disclosure. A description overlapping with FIG. 3 will be omitted.

Referring to FIG. 4, the docking station 100 may operate in a standby mode in operation S410. While executing the application 420 capable of controlling the mobile robot 200 or the docking station 100, the user terminal device 300 may receive a user command for controlling the operation of the docking station 100 in operation S420. For example, the user terminal device 300 may receive a user command for discharging dust collected in the mobile robot 200 or charging the mobile robot 200 from the docking station 100 on the application execution screen. The user terminal device 300 may transmit the input user command to the mobile robot 200.

When the user command is received from the user terminal device 300 in operation S430, the mobile robot 200 may transmit the wake-up signal to the docking station 100 through the near field communication module in operation S440. Upon receiving the wake-up signal, the docking station 100 may switch the operation state from the standby mode to the normal mode in operation S450. The docking station 100 may transmit the docking guide signal to the mobile robot 200 through the near field communication module in operation S460. The mobile robot 200 receiving the docking guide signal may dock to the docking station 100 in operation S470. The mobile robot 200 docked on the docking station 100 may transmit the user command received from the user terminal device 300 to the docking station 100 in operation S480. The docking station 100 may perform an operation corresponding to the user command received from the mobile robot 200 in operation S490. In operation S 495, the docking station 100 may obtain information related to an operation to be performed. Operation S495 of FIG. 4 may be the same as operation S345 of FIG. 3. Accordingly, since operations after the operation S495 of FIG. 4 are the same as operations after operation S345 of FIG. 3, redundant descriptions will be omitted.

Figure 5:
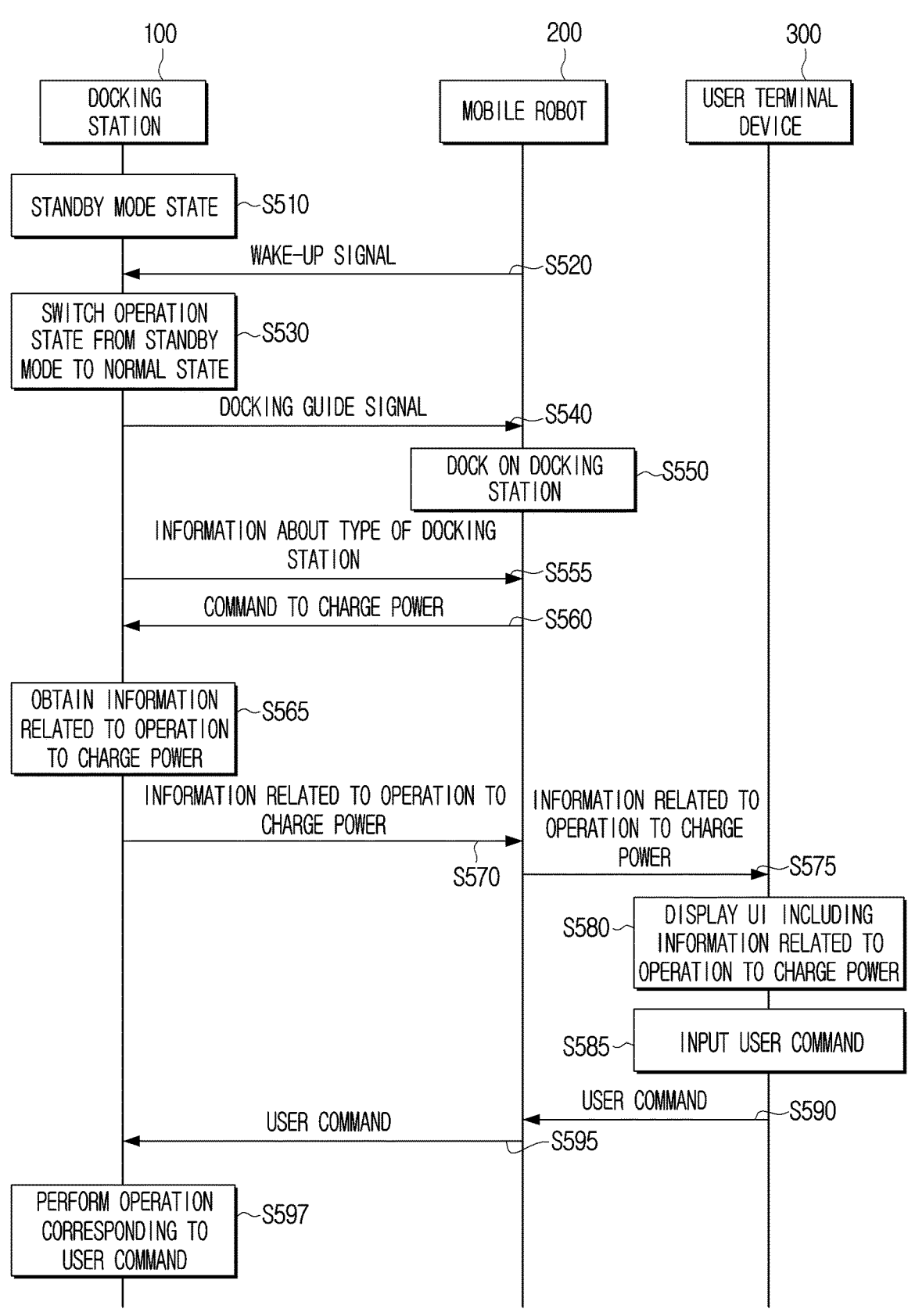

FIG. 5 is a flowchart illustrating an operation of a docking station according to an embodiment of the disclosure. Specifically, FIG. 5 illustrates an embodiment in which the docking station 100 is a model of a type capable of charging the power of the mobile robot 200. Since S510 to S555 of FIG. 5 are the same as operations S310 to S335 of FIG. 3, redundant descriptions will be omitted.

Referring to FIG. 5, the mobile robot 200 may transmit at least one command corresponding to the information on the type of the docking station 100 received from the docking station 100 to the docking station 100. If the docking station 100 is a model of a type of charging power of the mobile robot 200, the mobile robot 200 may transmit a command to charge power to the docking station 100 in operation S560. Upon receiving a command to charge the power, the docking station 100 may obtain information related to the power charging operation in operation S565. In an embodiment of the disclosure, the docking station 100 may obtain information related to the power charging operation while performing the operation of charging the mobile robot 200. As another example, the docking station 100 may receive a command to charge power or obtain information related to power charging within a threshold error range. As another example, the docking station 100 may obtain information related to the power charging operation after terminating the operation of charging the mobile robot 200. Since the information related to the power charging operation has been described above, a redundant description thereof will be omitted.

The docking station 100 may control the near field communicator 110 to transmit information related to the power charging operation obtained to the mobile robot 200 in operation S570. The mobile robot 200 may transmit received information related to the power charging operation to the user terminal device 300 in operation S575. The user terminal device 300 may display a UI including information related to the power charging operation based on the information received from the mobile robot 200 in operation S580. Since the operations S585 to S597 are the same as the operations S365 to S380, a repeated description thereof will be omitted.

Figure 6:
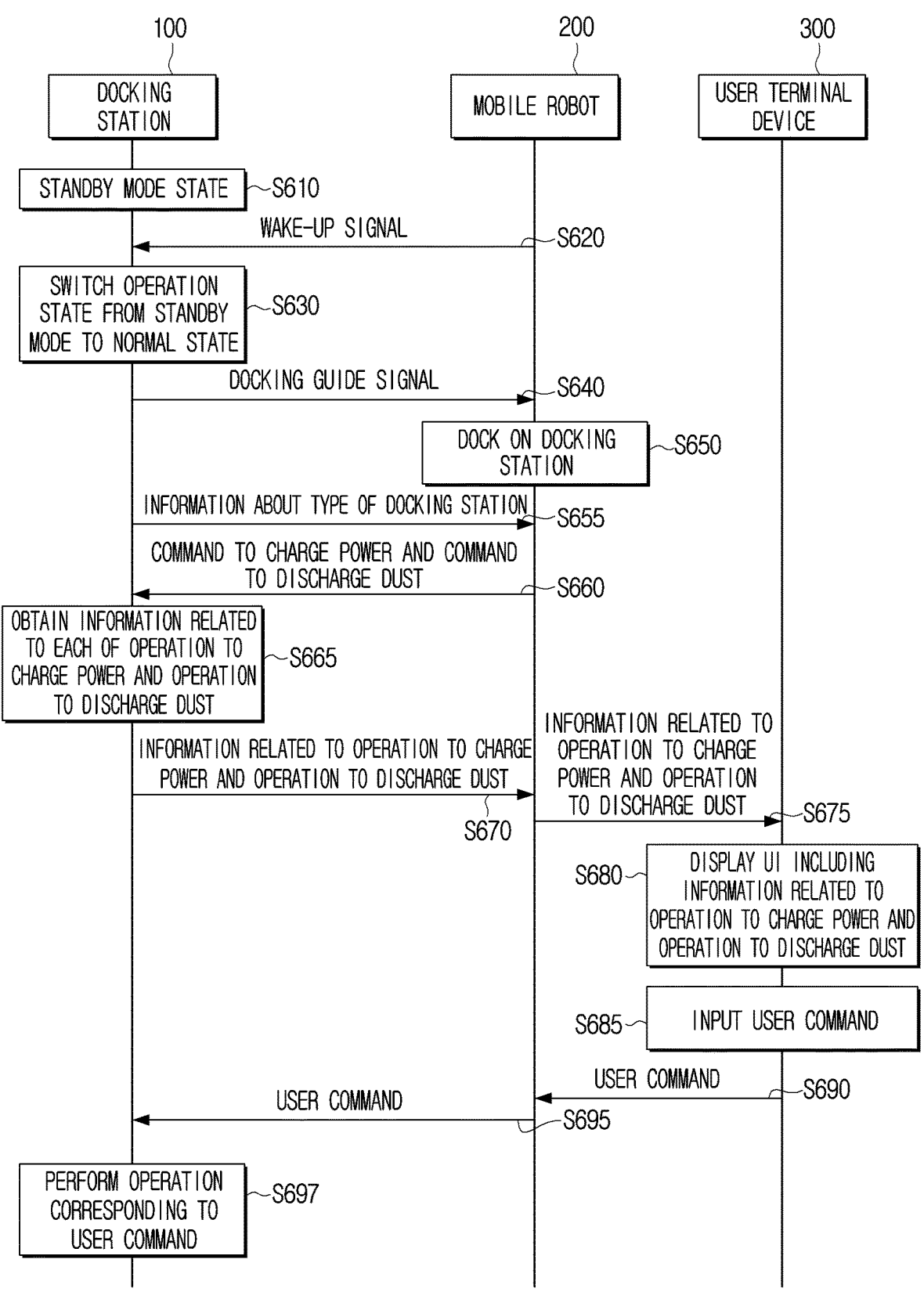

FIG. 6 is a flowchart illustrating an operation of a docking station 100 according to an embodiment of the disclosure. Specifically, FIG. 6 illustrates an embodiment in which the docking station 100 may charge the power of the mobile robot 200 and may discharge the dust collected in the mobile robot 200. Since the operations S610 through 5655 of FIG. 6 are the same as operations S310 through S335 of FIG. 3, redundant descriptions will be omitted.

Referring to FIG. 6, the mobile robot 200 may transmit at least one command corresponding to the information on the type of the docking station 100 received from the docking station 100 to the docking station 100. When the docking station 100 is a type of model capable of charging the power of the mobile robot 200 and discharging the dust collected in the mobile robot 200, the mobile robot 200 may transmit a command to charge the power and a command to discharge dust to the docking station 100 in operation S660. The mobile robot 200 may simultaneously transmit a command to charge power and a command to discharge dust, but this is merely an example and may be transmitted with a time difference. As another example, the mobile robot 200 may transmit each command according to a priority corresponding to the states of the mobile robot 200. For example, when the dust collected in the dust bag of the mobile robot 200 exceeds a threshold, the mobile robot 200 may first transmit a command to discharge dust to the docking station 100.

When the power of the mobile robot 200 is less than the threshold value, the mobile robot 200 may first transmit a command to charge power to the docking station 100.

When each command is received, the docking station 100 may obtain information related to each of the power charging operation and the dust discharge operation in operation S665. The docking station 100 may obtain information related to each operation after performing all operations. As another example, the docking station 100 may obtain information related to each operation while each operation is performed.

The docking station 100 may control the near field communicator 110 to transmit information related to the power charging operation obtained and an operation related to the dust discharge operation to the mobile robot 200 in operation S670. The mobile robot 200 may transmit information related to the received power charging operation and information related to the dust discharge operation to the user terminal device 300 in operation S675. The user terminal device 300 may display a UI including information related to the power charging operation and information related to the dust discharge operation based on the received information in operation S680. Since the operations S685 to S697 are the same as the operations S365 to S380, duplicated descriptions will be omitted.

Figure 7:
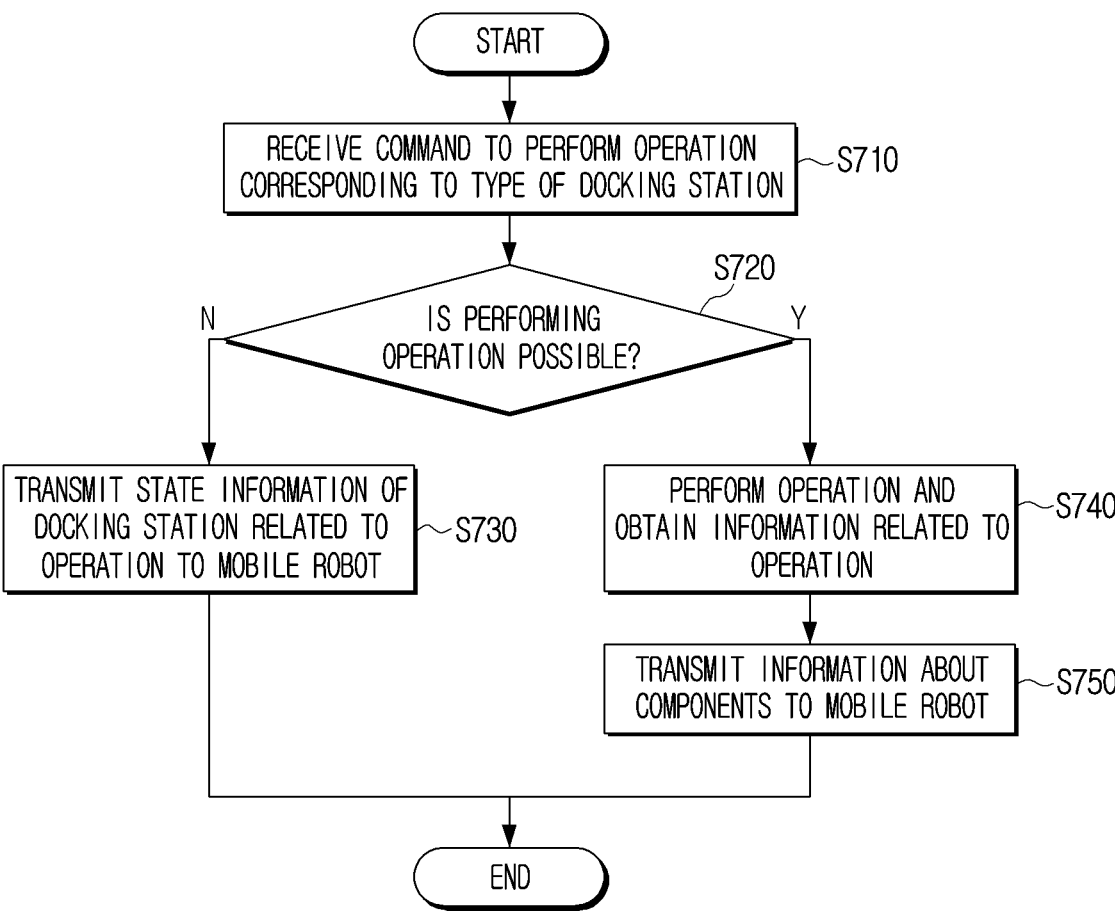
FIG. 7 is a flowchart illustrating transmission of various information to a mobile robot by a docking station according to an embodiment of the disclosure.

FIG. 7 is a flowchart illustrating an operation of a docking station according to an embodiment of the disclosure.

Referring to FIG. 7, S710 is the same as S340 of FIG. 3, a description related to the operations S310 to S335 which are previous operations will be omitted.

In operation S710, the docking station 100 may receive a command for performing an operation corresponding to the type of the docking station from the mobile robot 200. The docking station 100 may determine whether it is possible to perform an operation in operation S720.

In an embodiment of the disclosure, when a command for discharging dust included in the mobile robot 200 is received from the mobile robot 200, the docking station 100 may determine whether to perform an operation to discharge the dust included in the mobile robot 200. For example, the docking station 100 may identify whether power is sufficient enough to suck dust, whether the available space in the dust bag is greater than or equal to a threshold range, whether the dust bag is provided in the dust container in the docking station 100, whether the filter or the motor has exceeded the threshold based on the replacement time point. In another embodiment of the disclosure, when a command to charge the mobile robot 200 is input from the mobile robot 200, the docking station 100 may identify whether to perform an operation of charging the mobile robot 200. For example, the docking station 100 may identify whether power is sufficient to charge the mobile robot 200 and whether the efficiency of the power transmission device is equal to or greater than a threshold value. The docking station 100 may identify the state information of the docking station 100 related to the dust discharge operation to determine whether to discharge the dust included in the mobile robot 200 as described above.

When it is identified that the operation of the mobile robot 200 is not performed to perform the mobile robot 200, the docking station 100 may transmit information about the docking station related to the operation to the mobile robot 200 through the near field communicator in operation S730. The state information of the docking station associated with the operation may include information on the identified reason that the operation may not be performed. The mobile robot 200 may transmit information received from the docking station 100 to the user terminal device 300 or may transmit information received from the docking station 100 to the pre-registered terminal device of the user. As another example, the mobile robot 200 may output a message for the reason that the docking station 100 cannot perform a specific operation in a voice form. Accordingly, the user may recognize the reason why the docking station does not perform the specific operation through the user terminal device 300 or the mobile robot 200.

When it is identified that the operation corresponding to the command received from the mobile robot 200 may be performed, the docking station 100 may perform an operation corresponding to the command. The docking station 100 may obtain information related to an operation corresponding to the command in operation S740. The docking station 100 may transmit the obtained information to the mobile robot 200 in operation S750. Since operations S740 and S750 have been described above, redundant descriptions thereof will be omitted.

Figure 8:
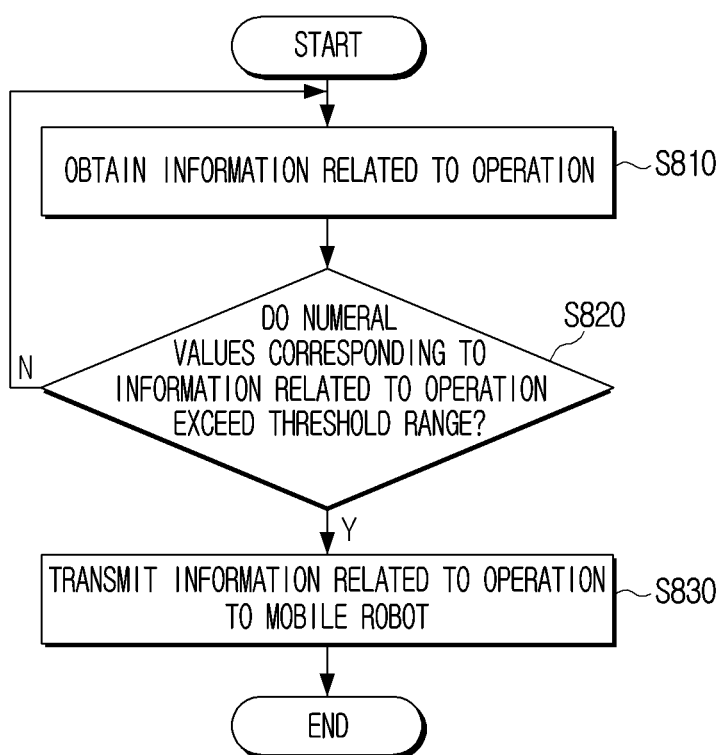
FIG. 8 is a flowchart illustrating an operation of a docking station and a mobile robot according to an embodiment of the disclosure.

FIG. 8 is a flowchart illustrating a process in which a docking station transmits information related to an operation to a mobile robot according to an embodiment of the disclosure.

Referring to FIG. 8, S810 is the same as operation S345 of FIG. 3. Since the operation of FIG. S810 is the same as the operations S310 to S340 of FIG. 3, redundant descriptions will be omitted.

In operation S810, the docking station 100 may obtain information related to an operation corresponding to the command received from the mobile robot 200. The docking station 100 may identify whether the numerical value corresponding to the information related to the operation exceeds the threshold range based on the information related to the obtained operation in operation S820. For example, the docking station 100 may identify whether a numerical value corresponding to information related to dust discharge exceeds a threshold range. The docking station 100 may identify whether a space filled with dust in the dust bag exceeds a threshold. As another example, the docking station 100 may identify whether a motor or a filter has been used in excess of a threshold number of times or a threshold time based on a replacement time point. As another example, the docking station 100 may identify whether the operating efficiency of the motor exceeds a threshold.

That the numerical value corresponding to the information related to the operation does not exceed the threshold range may mean that the state of the component necessary to perform the operation is normal. Accordingly, when the numerical value corresponding to the information related to the operation does not exceed the threshold range, the docking station may obtain information related to the operation. If it is identified that the numerical value corresponding to the operation related to the operation exceeds the threshold range, the docking station 100 may transmit the information related to the operation to the mobile robot 200 in operation S830.

The docking station 100 may transmit information related to operation to the mobile robot 200 periodically or in real time. As described with reference to FIG. 6, when the numerical value corresponding to the information related to the operation exceeds the threshold range, the docking station 100 may transmit information related to the operation to the mobile robot 200.

When the component on the docking station 100 is replaced from the user, the docking station 100 may recognize the detachment of the component through the sensor or identify the replacement of the component by determining the serial number of the replaced component. As another example, the docking station 100 may obtain information indicating that the component is replaced through the user terminal device 300 or the mobile robot 200. When determining the replacement of the components, the docking station 100 may initialize or reset a numerical value or a threshold range corresponding to the component state.

Figure 9A:
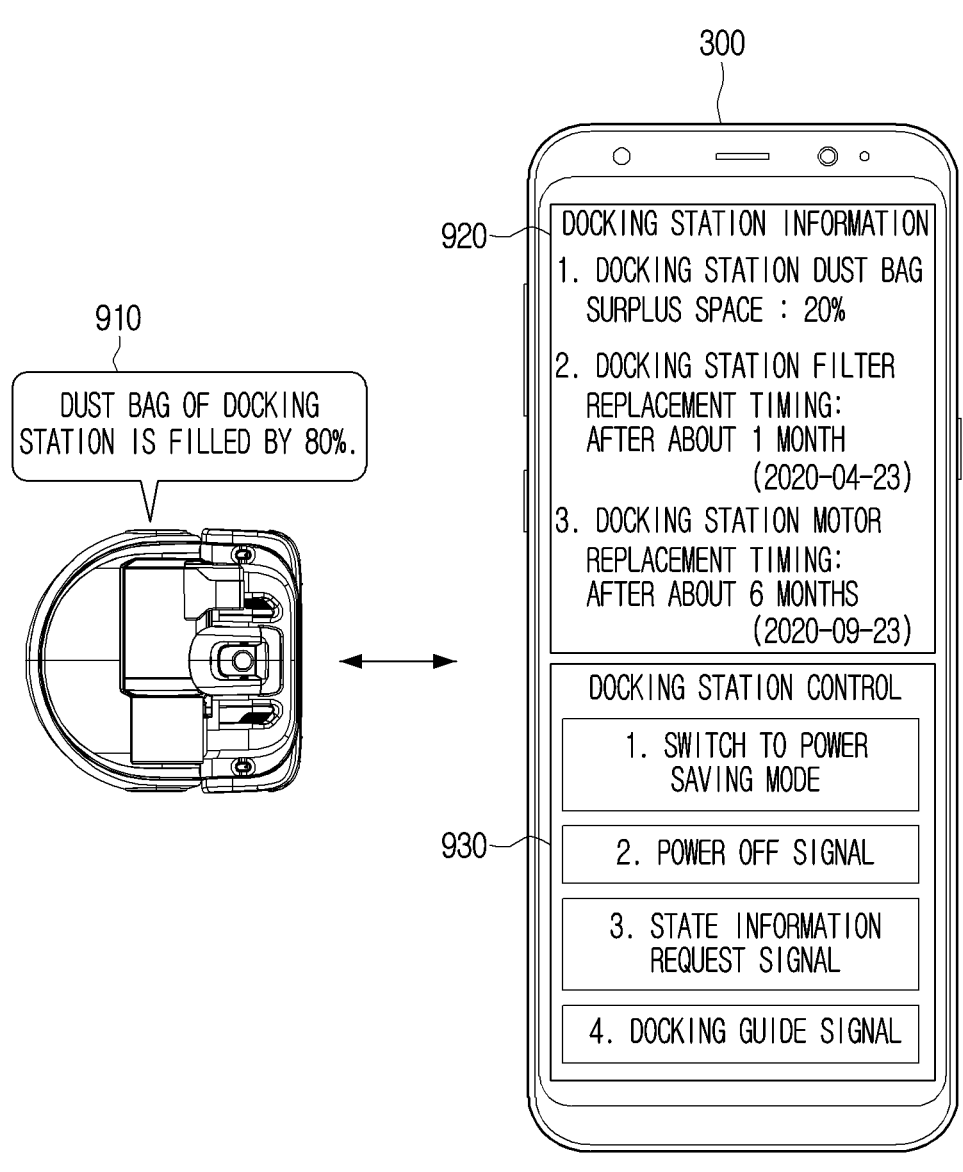
FIG. 9A is a diagram illustrating an operation of a mobile robot and a user terminal device according to an embodiment of the disclosure.

FIG. 9A is a diagram illustrating an operation of a mobile robot and a user terminal device according to an embodiment of the disclosure.

Referring to FIG. 9A, the mobile robot 200 may transmit, to the user terminal device 300, information related to an operation (e.g., a dust discharge operation or a power charging operation) that may be performed by the docking station 100 received from the docking station 100, or may output the information in various ways. For example, the mobile robot 200 may provide status information or an operation of the docking station 100 received from the docking station 100 as a message 910 in the form of a voice. For example, referring to FIG. 9A, when the docking station 100 receives information indicating that the available space of the dust bag remains 20%, the mobile robot 100 may output the message 910 indicating that the dust bag of the current docking station is filled by 80% in a voice form.

In another embodiment of the disclosure, the user terminal device 300 may display information on the state of the docking station 100 through various displays (e.g., a light emitting diode (LED), a 7-segment liquid crystal display (SEG LCD), a thin-film transistor liquid crystal display (TFT-LCD), or the like) included in the user terminal device 300. Accordingly, the user may identify the state of the component of the docking station 100 through information output by the mobile robot 200.

As still another embodiment of the disclosure, the mobile robot 200 may transmit the state information or information related to the operation of the docking station 100 received from the docking station 100 to the user terminal device 300.

The user terminal device 300 may execute an application capable of controlling the docking station 100 or the mobile robot 200 by a user command. The application execution screen executed by the user terminal device 300 may include a UI capable of determining information or state information related to an operation performed by the docking station 100. For example, when information related to an operation performed by the docking station 100 is received from the mobile robot 200, the user terminal device 300 may display an application execution screen including a UI 920 capable of determining information related to state information or operation of the docking station 100 based on the received information.

The user terminal device 300 may display a notification window including a UI 920 capable of determining information related to state information or operation of the docking station 100. In this case, the notification window displayed by the user terminal device 300 may also display a control UI capable of controlling the docking station 100. The user terminal device 300 may display the notification window as a push notification, and may display the notification window on a quick panel or a lock screen.

Referring to FIG. 9A, the user terminal device 300 may include a control UI 930 for controlling the operation of the docking station 100 on the application execution screen. When a command to perform a specific operation of the docking station is input from the user through the control UI 930, the user terminal device 300 may transmit a command to send the corresponding command to the docking station 100 to the mobile robot 200. The control UI 930 illustrated in FIG. 9A is merely an example, and may be implemented as a UI that may require various operations to the docking station 100.

For example, when a command to terminate the power of the docking station 100 is input from the user through a control UI 830, the user terminal device 300 may transmit a command for requesting the mobile robot 200 to transmit a command to terminate the power supply to the docking station 100. Upon receiving the command, the mobile robot 200 may transmit a command to terminate power to the docking station 100 through an infrared transmission module or the like. When a command to terminate the power supply is received through a near field communication module (e.g., an infrared receiving module, or the like), the docking station 100 may terminate the power supply. In another embodiment of the disclosure, the user terminal device 300 may output information related to state information and operation of the docking station 100 received from the mobile robot 200 in a voice form. Accordingly, the user may identify various information related to the state and operation of the docking station 100 through the user terminal device 300.

According to another embodiment of the disclosure, the user terminal device 300 may execute an application capable of determining a state of the docking station 100 according to a user command and controlling an operation. The mobile robot 200 may transmit information and status information related to the operation received from the docking station 100 to the server 400 capable of managing or controlling the application. The server 400 may transmit information received from the mobile robot 300 to the user terminal device 300. The user terminal device 300 may update information and state information related to an operation performed by the docking station 100, which is previously stored, by using information related to the operation performed by the docking station 100 received from the server 400 and state information. When a user command for executing an application is input, the user terminal device 300 may display an application execution screen including a UI indicating information related to an operation performed by the updated docking station 100 and state information. Accordingly, the user may easily recognize information related to the operation of the docking station or the current state information of the docking station through the user terminal device 300.

Figure 9B:
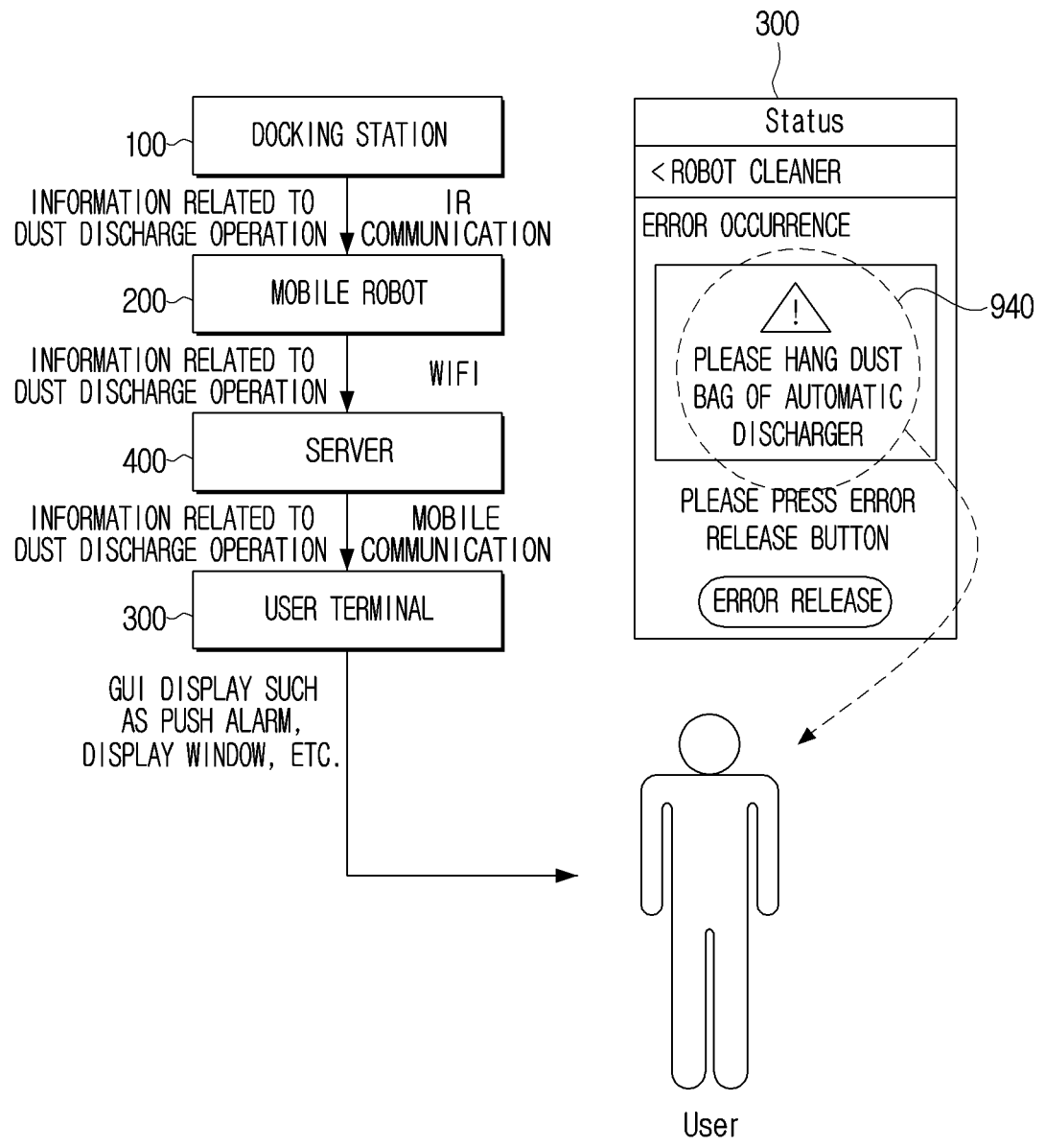
FIGS. 9B and 9C are diagrams illustrating an operation of a docking station, a mobile robot, a user terminal device, and a sever according to various embodiments of the disclosure.
Figure 9C:
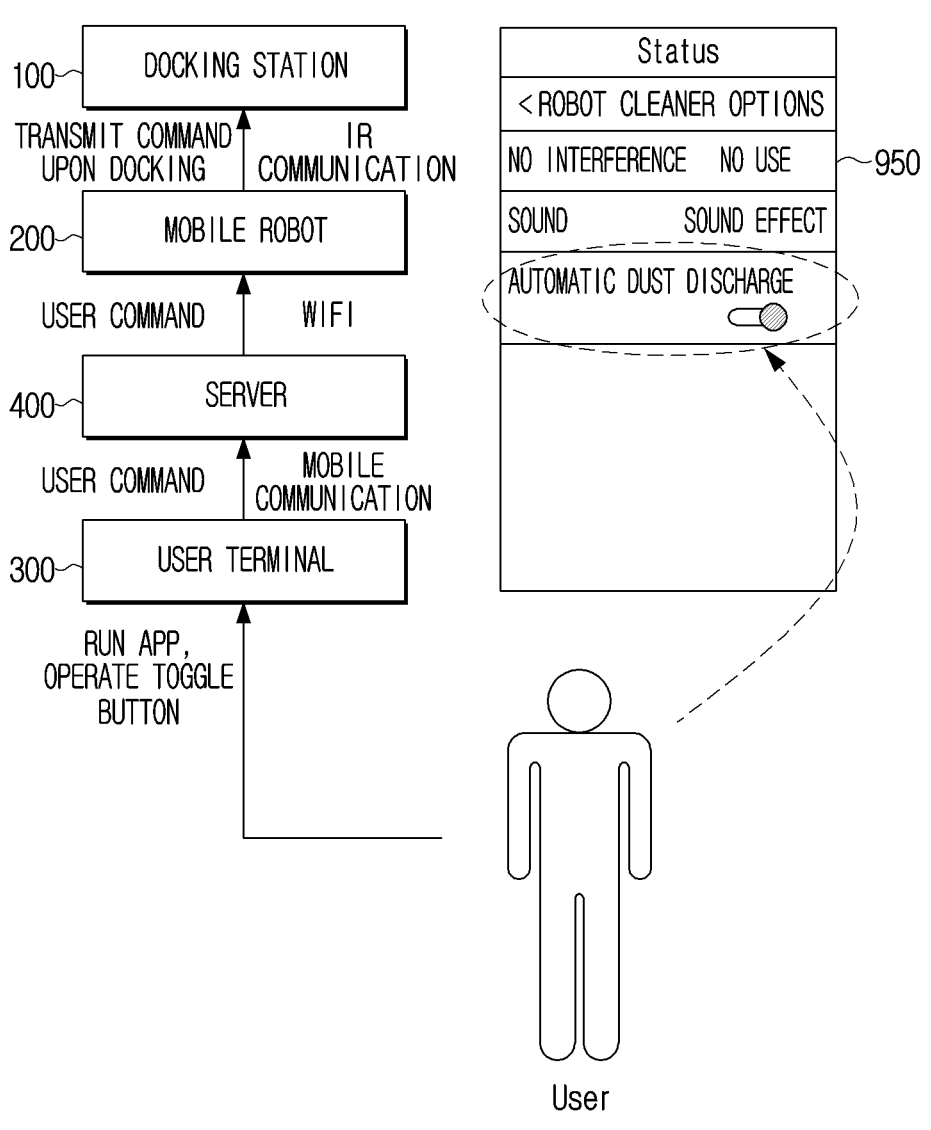

FIGS. 9B and 9C are diagrams illustrating an operation of a docking station, a mobile robot, a user terminal device, and a sever according to various embodiments of the disclosure. FIGS. 9B and 9C assume that the docking station 100 is a model of a type capable of performing a dust discharge operation.

Referring to FIG. 9B, the docking station 100 may transmit information related to the dust discharge operation to the mobile robot 200 using the IR module. However, this is merely an example, and the docking station 100 may transmit various information to the mobile robot 200 using various near field communicators, such as an RF module. The mobile robot 200 may transmit information related to the dust discharge operation to the server 400. In this case, the server 400 may be at least one of a server of a manufacturer of a mobile robot or a docking station, a server for managing and controlling an application capable of controlling a mobile robot or a docking station, and a relay server. Referring to FIG. 9B, the mobile robot 200 may transmit various information to the server 400 using a Wi-Fi module, but this is merely an example and various information may be transmitted to the server 400 using various wireless communication modules.

The server 400 may transmit received information related to the dust discharge operation to the user terminal device 300. The user terminal device 300 may display an application screen including a UI indicating information related to a dust discharge operation. For example, when information indicating that the dust container of the docking station is not closed among the information related to the dust discharge operation is received, the user terminal device 300 may provide an application screen displaying a UI including a notification window 940 to close the dust container. Although FIG. 9B illustrates that the notification window 840 is displayed on the application screen, this is merely an example, and the user terminal device 400 may display the notification window 840 in various regions, such as a push notification, a quick panel, and a lock screen.

Referring to FIG. 9C, the user terminal device 300 may receive a command to perform various operations from a user on an application capable of controlling a docking station or a mobile robot, referring to FIG. 9C. For example, the user terminal device 300 may display an application screen including a control UI 950 capable of controlling the docking station 100. When a toggle button for automatically discharging dust collected in the mobile robot 200 is input from the user, the user terminal device 300 may transmit a command to perform an operation of automatically discharging dust to the server 400. The server 400 may transmit a command instructing to automatically discharge dust to the mobile robot 200 pre-registered by the user. If docked on the docking station 100, the mobile robot 200 may transmit a command received from the server 400 to the docking station 100 using the near field communicator 210-1. The docking station 100 may automatically discharge dust included in the docked mobile robot 200 in response to the received command.

FIG. 10 is a flowchart illustrating a mobile robot management method including a docking station and a mobile robot according to an embodiment of the disclosure.

Referring to FIG. 10, the mobile robot 200 may transmit a command for discharging dust included in the mobile robot 200 to the docking station 100 in operation S1010. Specifically, if docked on the docking station 100, the mobile robot 200 may transmit a command to discharge dust to the docking station 100 through the near field communicator.

In an embodiment of the disclosure, when the mobile robot 200 is docked on the docking station 100, the mobile robot 200 may immediately transmit a command for discharging dust to the docking station 100. In another embodiment of the disclosure, if the mobile robot 200 is docked on the docking station 100, the docking station 100 may transmit information about the type of the docking station 100 to the mobile robot 200. If it is identified that the docking station 100 is a type of device for discharging dust of the mobile robot through the information on the type of the docking station 100, the mobile robot 200 may transmit a command for discharging dust to the docking station 100.

When a command for discharging dust from the mobile robot 200 is received from the mobile robot 200, the docking station 100 may obtain information related to the dust discharge operation from the mobile robot 200 in operation S1020. In order to transmit information related to the obtained operation to the user terminal device 300 connected to the mobile robot 200, the docking station 100 may transmit information related to the obtained dust discharge operation to the mobile robot 200 in operation S1030. The docking station 100 may transmit information related to the obtained operation to the mobile robot 200 through a near field communicator (e.g., an infrared transmission module, or the like). The mobile robot 200 may transmit information related to the dust discharge operation received from the docking station 100 to the user terminal device 300 in operation S1040. Accordingly, the user may recognize information related to the state information or operation of the docking station through the user terminal device 300 or the like.

Embodiments may be implemented as software that includes instructions stored in machine-readable storage media readable by a machine (e.g., a computer). A device may call instructions from a storage medium and that is operable in accordance with the called instructions, including an electronic device (e.g., the electronic device 100). When the instruction is executed by a processor, the processor may perform the function corresponding to the instruction, either directly or under the control of the processor, using other components. The instructions may include a code generated by a compiler or a code executed by an interpreter. The machine-readable storage medium may be provided in the form of a non-transitory storage medium. The, "non-transitory" storage medium may not include a signal and is tangible, but does not distinguish whether data is permanently or temporarily stored in a storage medium. For example, the "non-transitory storage medium" may include a buffer in which data is temporarily stored.

According to various embodiments of the disclosure, a method disclosed herein may be provided in a computer program product. A computer program product may be traded between a seller and a purchaser as a commodity. A computer program product may be distributed in the form of a machine-readable storage medium (e.g., a compact disc ROM (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium, such as a manufacturer's server, a server in an application store, or a memory in a relay server.

In addition, each of the components (e.g., modules or programs) according to various embodiments may include a single entity or a plurality of entities, and some sub-components of the sub-components described above may be omitted, or other sub-components may be further included in the various embodiments. Alternatively or additionally, some components (e.g., modules or programs) may be integrated into one entity to perform the same or similar functions performed by the respective components prior to the integration. The operations performed by the module, the program, or other component, in accordance with various embodiments may be performed in a sequential, parallel, iterative, or heuristic manner, or at least some operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A docking station of a mobile robot comprising:
a near-field communicator to communicate with the mobile robot;
a memory; and
at least one processor configured to:
based on receiving a command to discharge dust from the mobile robot through the near-field communicator, obtain information related to dust discharge operation, and
in order to transmit the obtained information related to the dust discharge operation to a user terminal device connected to the mobile robot, control the near-field communicator to transmit the information related to the dust discharge operation to the mobile robot,
wherein the processor is further configured to:
receive commands related to the dust discharge operation from the user terminal device via the mobile robot, and
transmit state information of the docking station to the user terminal device via the mobile robot.

2. The docking station of claim 1, wherein the at least one processor is further configured to:
identify whether a numeral value corresponding to the obtained information related to the dust discharge operation exceeds a threshold range, and
based on identification that the numeral value exceeds the threshold range, control the near-field communicator to transmit the information related to the dust discharge operation to the mobile robot.

3. The docking station of claim 1,
wherein the information related to the dust discharge operation comprises information about a component to discharge dust included in the mobile robot; and
wherein the component to discharge the dust included in the mobile robot comprises at least one of a dust bag, a filter, or a motor for sucking dust.

4. The docking station of claim 3,
wherein the information about the dust bag comprises a surplus space of the dust bag, whether the dust bag is mounted, and a type of the dust bag,
wherein the information about the filter comprises a number of uses of the filter, a use time, whether a filter is mounted, and a type of a filter, and
wherein the information about the motor comprises an operation efficiency use time, a failure state, and a type of the motor.

5. The docking station of claim 4, wherein the at least one processor is further configured to:
while performing an operation to discharge dust included in the mobile robot, obtain the information about the dust bag, filter, and the motor, respectively, and
control the near-field communicator to transmit the obtained information about the dust bag, filter, and motor, respectively, to the mobile robot.

6. The docking station of claim 1, wherein the at least one processor is further configured to:
based on receiving a wake-up signal from the mobile robot while the docking station is operating in a standby mode, switch an operation mode of the docking station from a standby mode to a normal mode, and
control the near-field communicator so that the docking station transmits a docking guide signal to the mobile robot while the docking station is operating in the normal mode.

7. The docking station of claim 1, wherein the at least one processor is further configured to:

based on receiving a command to discharge dust included in the mobile robot from the mobile robot, determine whether to perform the dust discharge operation, and
based on determination that the dust discharge operation is not performed, control the near-field communicator to transmit the information related to the dust discharge operation to the mobile robot.

8. The docking station of claim 1, wherein the at least one processor is further configured to:
based on the mobile robot being docked on the docking station, control the near-field communicator to transmit the information about a type of the docking station to the mobile robot, and
receive at least one command corresponding to the information about the type of the docking station from the mobile robot through the near-field communicator.

9. The docking station of claim 8, wherein the at least one processor is further configured to:
based on receiving a command to charge power of the mobile robot from the mobile robot through the near-field communicator, obtain information about at least one of a power storage device, a power transmission device, or a power generation device included in the docking station, and
control the near-field communicator to transmit the obtained information about at least one of the power storage device, power transmission device, or power generation device to the mobile robot.

10. The docking station of claim 1, wherein the near-field communicator comprises at least one of an infrared communication module or a radio frequency module.

11. A mobile robot comprising:
a communicator comprising a circuitry;
a memory; and
at least one processor configured to:
based on docking on a docking station, control a near-field communicator, among the communicators, to transmit a command to discharge dust included in the mobile robot to the docking station,
receive information related to dust discharge operation from the docking station through the near-field communicator, and
control the communicator to transmit the received information about the dust discharge operation to a user terminal device,
wherein the processor is further configured to:
receive commands related to the dust discharge operation from the user terminal device and transmit the received commands to the docking station, and
receive state information of the docking station from the docking station and transmit the received information to the user terminal device.

12. The mobile robot of claim 11, wherein the at least one processor is further configured to control the near-field communicator to periodically transmit a wake-up signal that enables to switch an operation mode of the docking station from a standby mode to a normal mode.

13. The mobile robot of claim 11, wherein the at least one processor is further configured to, based on the mobile robot being docked on the docking station, control the near-field communicator to transmit a signal requesting information about a type of the docking station to the mobile robot.

14. The mobile robot of claim 13, wherein the at least one processor is further configured to, based on receiving information about the type of the docking station from the mobile robot, control the near-field communicator to transmit at least one command corresponding to the information about the type of docking station to the docking station.

15. The mobile robot of claim 14, wherein the at least one processor is further configured to, based on identification that the docking station is a model of a type of charging power of the mobile robot based on the information about the type of the docking station, control the near-field communicator to transmit a command to charge power to the docking station.

16. A method of managing a mobile robot management including a docking station and a mobile robot, the method comprising:

transmitting a command to discharge dust included in the mobile robot to the docking station by the mobile robot, based on receiving a command to discharge dust from the mobile robot by the docking station;

obtaining information related to dust discharge operation;

transmitting the obtained information related to the dust discharge operation to the mobile robot by the docking station;

transmitting the information related to the dust discharge operation received from the docking station by the mobile robot to a user terminal device,

receiving commands related to the dust discharge operation at the docking station from the user terminal device via the mobile robot; and transmitting state information of the docking station from the docking station to the user terminal device via the mobile robot.

17. The mobile robot of claim 11, wherein the at least one processor is further configured to:

determine a priority of a first command based on a first state of the mobile robot, determine a priority of a second command based on a second state of the mobile robot, and transmit the first command and the second command to the docking station in order of a highest priority among the priority of the first command and the priority of the second command.

18. The docking station of claim 1, wherein the docking station is incapable of communicating directly with the user terminal device.

19. The docking station of claim 1, wherein the near-field communicator is unconfigured for direct communication with the user terminal device.

* * * * *